United States Patent
Deokar et al.

(10) Patent No.: US 9,965,036 B2
(45) Date of Patent: May 8, 2018

(54) HAPTIC GUIDES FOR A TOUCH-SENSITIVE DISPLAY

(71) Applicant: MOTOROLA MOBILITY LLC, Chicago, IL (US)

(72) Inventors: Itisha C. Deokar, Buffalo Grove, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 741 days.

(21) Appl. No.: 14/334,835

(22) Filed: Jul. 18, 2014

(65) Prior Publication Data

US 2016/0018890 A1 Jan. 21, 2016

(51) Int. Cl.
| | | |
|---|---|---|
| *G06F 3/0484* | (2013.01) | |
| *G06F 3/01* | (2006.01) | |
| *G06F 3/0488* | (2013.01) | |
| *G06F 3/044* | (2006.01) | |

(52) U.S. Cl.
CPC .............. *G06F 3/016* (2013.01); *G06F 3/044* (2013.01); *G06F 3/0488* (2013.01); *G06F 2203/014* (2013.01)

(58) Field of Classification Search
CPC ... G06F 3/00; G06F 3/01; G06F 3/016; G06F 3/017; G06F 3/041; G06F 3/0412; G06F 3/0416; G06F 3/048; G06F 3/0484; G06F 3/04842; G06F 3/0488; G06F 3/04883; G08B 6/00; G09B 21/003
See application file for complete search history.

(56) References Cited

U.S. PATENT DOCUMENTS

| | | | |
|---|---|---|---|
| 5,580,251 A * | 12/1996 | Gilkes | G09B 21/003 340/407.1 |
| 5,719,561 A | 2/1998 | Gonzales | |
| 6,359,550 B1 | 3/2002 | Brisebois et al. | |
| 6,459,364 B2 * | 10/2002 | Gupta | G09B 21/005 340/4.12 |
| 7,245,292 B1 | 7/2007 | Custy | |
| 8,633,907 B2 * | 1/2014 | Mahalingam | G09B 21/003 178/18.01 |
| 8,692,798 B1 | 4/2014 | Zhang | |
| 8,696,357 B2 | 4/2014 | AlDossary | |
| 9,105,198 B2 | 8/2015 | Habas | |
| 9,183,759 B2 | 11/2015 | Bourdon et al. | |
| 2002/0045151 A1 | 4/2002 | Roberts et al. | |
| 2004/0057578 A1 | 3/2004 | Brewer | |
| 2004/0110562 A1 | 6/2004 | Kajino et al. | |
| 2007/0152982 A1 | 7/2007 | Kim et al. | |
| 2007/0208492 A1 | 9/2007 | Downs et al. | |

(Continued)

OTHER PUBLICATIONS

Gerhardt, "Moldable Alloy Will Make Braille Smartphone a Reality," New interface on prototype can help the blind text plus use everyday tools like maps, Apr. 29, 2013, 3 pp.

(Continued)

*Primary Examiner* — Xiomar L Bautista
(74) *Attorney, Agent, or Firm* — Shumaker & Sieffert, P.A.

(57) ABSTRACT

This disclosure describes techniques and apparatuses enabling haptic guides for a touch-sensitive display. The techniques enable users to interact with their mobile devices using haptics, including to make touch selections for their devices.

23 Claims, 19 Drawing Sheets

(56) References Cited

U.S. PATENT DOCUMENTS

| | | | |
|---|---|---|---|
| 2007/0254268 A1* | 11/2007 | Adachi | G09B 21/003 434/112 |
| 2008/0208265 A1 | 8/2008 | Frazier et al. | |
| 2008/0246737 A1* | 10/2008 | Benali-Khoudja | G09B 21/003 345/173 |
| 2010/0162109 A1 | 6/2010 | Chatterjee et al. | |
| 2011/0234502 A1* | 9/2011 | Yun | G06F 3/016 345/173 |
| 2011/0269106 A1 | 11/2011 | Schroeder et al. | |
| 2012/0218090 A1 | 8/2012 | Rothschild | |
| 2012/0286944 A1* | 11/2012 | Forutanpour | G06F 3/04847 340/407.1 |
| 2012/0299853 A1* | 11/2012 | Dagar | G06F 3/016 345/173 |
| 2012/0306633 A1 | 12/2012 | Heron et al. | |
| 2012/0319981 A1* | 12/2012 | Habas | G09B 21/008 345/173 |
| 2012/0327001 A1* | 12/2012 | Higginson | G06F 3/04886 345/173 |
| 2013/0029297 A1* | 1/2013 | Tsai | G09B 21/004 434/114 |
| 2013/0157230 A1* | 6/2013 | Morgan | G09B 21/02 434/114 |
| 2013/0222226 A1* | 8/2013 | Terlouw | G06F 3/041 345/156 |
| 2013/0246965 A1 | 9/2013 | Ninomiya | |
| 2013/0321340 A1* | 12/2013 | Seo | G06F 1/1641 345/174 |
| 2013/0339112 A1 | 12/2013 | Palexas | |
| 2014/0040735 A1 | 2/2014 | Jung | |
| 2014/0139436 A1 | 5/2014 | Ramstein et al. | |
| 2014/0164593 A1 | 6/2014 | Murrary et al. | |
| 2014/0320436 A1* | 10/2014 | Modarres | G06F 3/0412 345/173 |
| 2014/0026101 A1 | 12/2014 | Pallakoff et al. | |
| 2014/0356843 A1 | 12/2014 | Yang et al. | |
| 2015/0123775 A1* | 5/2015 | Kerdemelidis | G08B 6/00 340/407.1 |
| 2015/0223355 A1 | 8/2015 | Fleck et al. | |
| 2015/0253848 A1* | 9/2015 | Heubel | G06F 3/016 345/173 |
| 2016/0018890 A1 | 1/2016 | Deokar et al. | |
| 2016/0018920 A1 | 1/2016 | Deokar et al. | |
| 2016/0019817 A1 | 1/2016 | Deokar et al. | |

OTHER PUBLICATIONS

Non-Final Office Action from U.S. Appl. No. 14/334,775, dated Jun. 6, 2016 10 pgs.
Response to Non-Final Office Action from U.S. Appl. No. 14/334,775, dated Jun. 6, 2016, filed Aug. 31, 2016 9 pgs.
Prosecution History from U.S. Appl. No. 14/334,775, dated Apr. 5, 2017 through Apr. 28, 2017, 13 pp.
Final Office Action from U.S. Appl. No. 141334,775, dated Dec. 20, 2016, 10 pp.
Response to the Final Office Action dated Dec. 20, 2016, from U.S. Appl. No. 14/334,775, filed Feb. 16, 2017, 11 pp.
Advisory Action from U.S. Appl. No. 14/334,775, dated Feb. 27, 2017, 4 pp.

\* cited by examiner

HAPTIC GUIDES FOR A TOUCH-SENSITIVE DISPLAY

CROSS REFERENCE TO RELATED APPLICATIONS

This application is related to co-owned U.S. patent application Ser. No. 14/334,775, entitled "Wearable Haptic And Touch Communication Device", and U.S. patent application Ser. No. 14/334,800, entitled "Wearable Haptic Device For The Visually Impaired" and filed concurrently herewith.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Users of mobile computing devices, such as smart phones, often struggle with small displays common to these mobile devices. Some users struggle because they are occupied with other tasks and so cannot concentrate on interacting with the small display. Other users may struggle because of visual disabilities or impairments, such as those that are blind, have generally poor eyesight, or are older and therefore have trouble focusing at distances common for use of mobile device displays. These difficulties affect many users' ability to enjoy their devices, and thus are a significant usage limitation.

BRIEF DESCRIPTION OF THE DRAWINGS

Techniques and apparatuses enabling haptic guides for a touch-sensitive display are described with reference to the following drawings. The same numbers are used throughout the drawings to reference like features and components.

DETAILED DESCRIPTION

Figure 1:
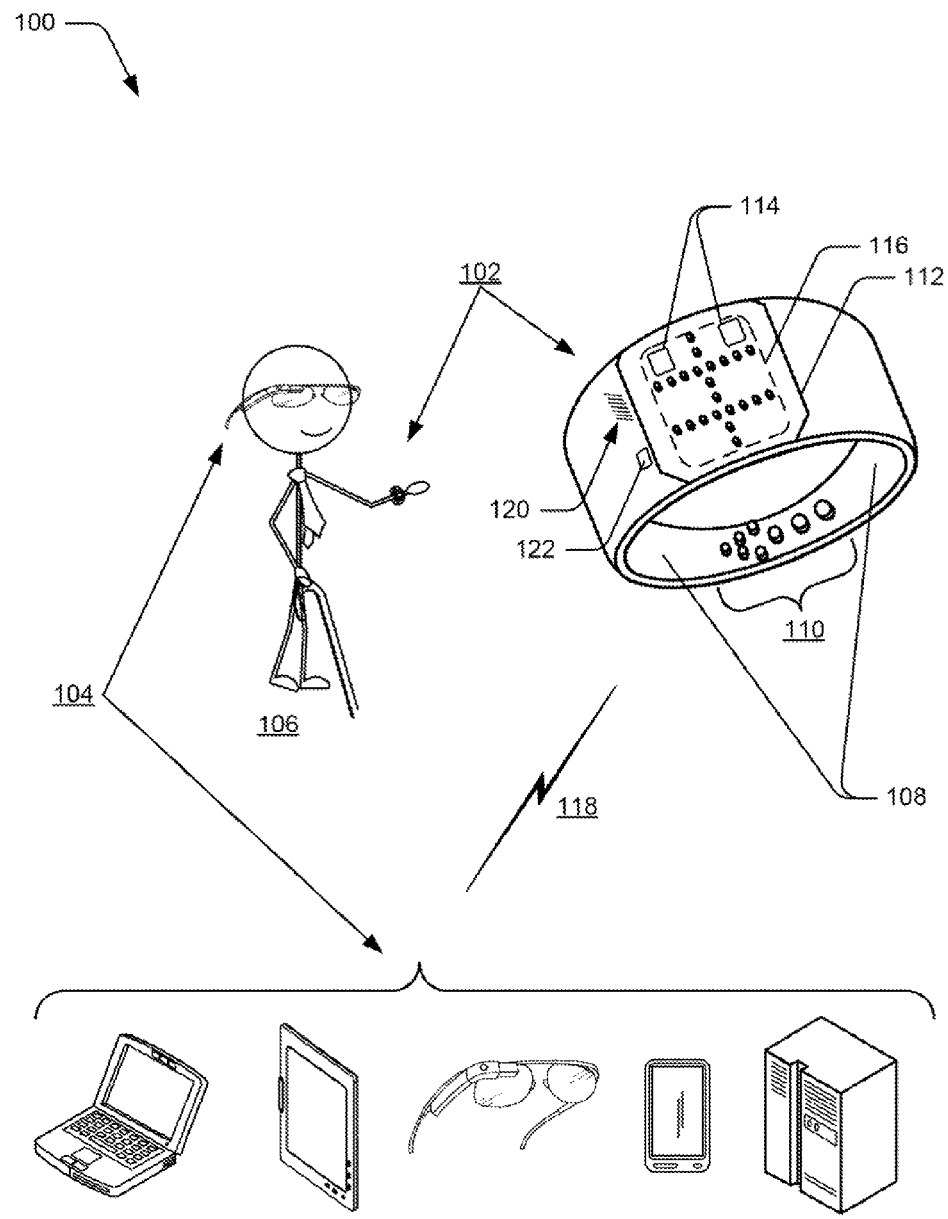
FIG. 1 illustrates an example environment in which a communication device can be enabled.

Many users have difficulty using mobile computing devices because of their displays. Some of this is due to the size of the displays, which makes reading information on the display and selecting controls through the display difficult, even for users with no impairments or distractions. Many smartphones, for example, may have a touch-sensitive display for reading and interacting with the smartphone that is only about two inches by three inches in size. Some mobile devices have very small displays, such as computing bracelets and rings, which can be about one inch on each side. Tablet computing devices generally have larger screens, from about four by six inches to much larger. Even these larger-display devices, however, can be difficult to use, such as for users that are preoccupied or other users that have hand-dexterity or visual impairments.

This disclosure describes techniques and apparatuses enabling haptic guides for a touch-sensitive display. The techniques enable users to interact with their mobile devices using haptics, both to receive information from their devices and to make selections for their devices. The techniques enable information to be provided to users even without a visual display or audio output. In some cases, the techniques provide information through skin contact. This skin contact can be through active use of a user's finger, for example, such as passing a fingertip over projected or exposed symbols (e.g., braille or other text), thereby allowing a user to "read" information through his or her finger. In some other cases, the techniques provide information through a skin contact region, such as a user's wrist. In this case, a user may sense information without use of another hand, and thus receive information passively.

Further, this disclosure describes techniques and apparatuses enabling users to make selections using haptics. In one case, for example, a user's finger is guided to selectable regions of a touch-sensitive display using haptic guides. These guides project from the display surface, thereby guiding a user's finger to particular regions.

By way of example, assume a user is driving and receives a text message from a friend. The text message is "the meeting is about to start, will you be here soon?" Assume that the user is driving and thus is unable to be fully attentive to her mobile device. A mobile communication device as described herein can both provide the content of the text message and receive selection of ways in which to respond through haptic guides, either fully through haptics or in conjunction with visual or audio output. Thus, the message can be provided through a skin contact region, audio speakers, or with a visual display. The techniques then provide haptic guides to aid in selecting controls on a display, such as selectable responses: "Yes," "No," "On my way," and "I will be late."

The following discussion first describes an operating environment, detailed illustrations of various devices and haptic elements, followed by techniques that may be employed in this environment and using these devices and haptic elements, and ends with an example apparatus.

Operating Environment

FIG. 1 illustrates an example environment 100 in which a communication device having haptic guides can be enabled. This example environment 100 includes a communication device 102, a remote computing device 104, and a user 106.

Communication device 102 includes an inner surface 108 having a skin-contact region 110, which is configured to provide haptic output via contact with human skin (e.g., a wrist of user 106). Communication device 102 also includes an outer surface 112 configured to receive touch input, such as from user 106 selecting touch-sensitive controls 114 of a touch-sensitive display 116 on outer surface 112. Haptics, as the term is used herein, includes an array of possible touch-related output and structures. Some haptics are structures that are provided and then removed, such as haptic guides provided over or through outer surface 112. Some haptics provide more-rapid movement, such as rapidly moving, shaking, or pulsing projections on skin-contact region 110, which may indicate direction, a warning, reception of a message, and so forth. Further, haptics can be provided for passive or active reception by a user, such as projections over or through outer surface 112 (e.g., Braille symbols) that a user reads by actively moving his or her finger over the projections. Other haptics can be received by a user passively, for example as projections provided directly to a user's wrist through skin-contact region 110. Various examples of haptics, including actively received, passively received, providing output, receiving input, and enabling or aiding input are described in detail below.

In this example environment 100, communication device 102 communicates with remote computing device 104 through communication network 118. Communication network 118 includes one or more wired or wireless networks, such as a local-area-network (LAN), a wireless local-area-network (WLAN), a personal-area-network (PAN), a wide-area-network (WAN), an intranet, the Internet, a peer-to-peer network, point-to-point network, a mesh network, and the like. In some cases, for example, communication device 102 acts as a communication device for one of remote computing devices 104, such as computing spectacles using communication device 102 to provide haptic output to aid a visually impaired person to avoid physical obstructions sensed by the computing spectacles.

Communication device 102 may also include a speaker 120 and a physical vibrator 122. Speaker 120 is configured to provide audio output and physical vibrator 122 is configured to provide indications through vibration, sound, pulses, and so forth. Physical vibrator 122, in some cases, may be included within haptic devices described herein, or may be a separate device.

Figure 2:
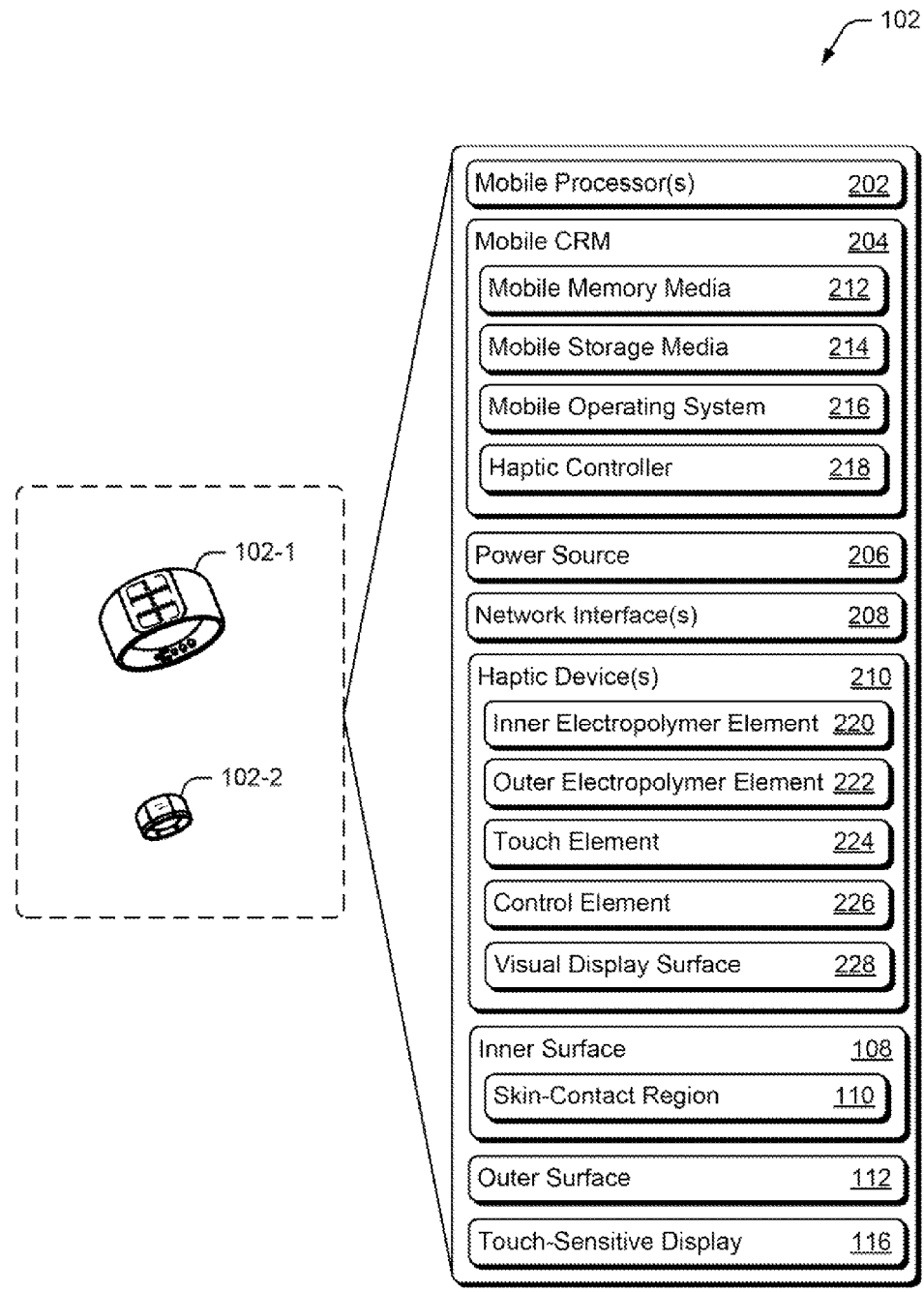
FIG. 2 illustrates a detailed example of the communication device of FIG. 1.

With environment 100 described, consider FIG. 2, which illustrates a detailed example of communication device 102 of FIG. 1. Communication device 102 is shown with two example devices, computing bracelet 102-1 and computing ring 102-2, though others may also be used, such as computing spectacles (excepting a touch-sensitive display).

Communication device 102 includes one or more mobile processors 202, mobile computer-readable media (CRM) 204, power source 206, network interfaces 208, and one or more haptic devices 210, as well as elements noted in FIG. 1, inner surface 108, skin-contact region 110, outer surface 112, and touch-sensitive display 116. Network interfaces 208 are capable of communicating through various communication links or networks noted herein, and may include any combination of wireless or wired transmitters, receivers, or transceivers to enable these communications.

Note that various elements of haptic device 210 and touch-sensitive display 116 are, in some cases, integrated, interchangeable, and/or work in conjunction, descriptions and examples of which are set forth later below.

Computer-readable media 204 includes mobile memory media 212, mobile storage media 214, mobile operating system 216, and haptic controller 218. Applications can be embodied as computer-readable instructions on mobile memory media 212, which can be executed by mobile processors 202 to provide operations described for communication device 102.

Generally, haptic controller 218 is capable of controlling haptic devices 210, such as to cause them to provide haptic output based on data from various sources. In some cases, haptic controller 218 is configured to cause haptic devices 210 to provide tactile projections to present visually or physically readable (e.g., braille) symbols based on received data. This received data may be content of a message, such as an email or short-messaging-service (SMS) message (e.g., text message), or may be other data, such as object-proximity data. For object proximity data, haptic controller 218 may cause haptic devices 210 to raise tactile projections to indicate to a wearer of communication device 102 an impediment or danger. Further, haptic controller 218 may raise haptic guides to aid users through visual cues or physical structures to select regions of a surface, such as selectable controls in regions of a touch-sensitive display. These are but a few of the operations and functions of haptic controller 218. These and other operations are described in greater detail below.

Haptic device 210 includes one or more of an inner electropolymer element 220, an outer electropolymer element 222, a touch element 224, a control element 226, and/or a visual display surface 228. Each of electropolymer elements 220 and 222 can be configured, generally when in an actuated state, to provide haptic output via contact with human skin (e.g., a wrist of user 106), haptic guides, and/or haptic input structures. Note that electropolymer elements can include or be integral with control element 226, in which case the elements can be an electroactive polymer actuator array.

In more detail, electropolymer elements 220, 222 are capable of reacting to an applied voltage effective to alter mechanics of their material. Electropolymer elements 220, 222 can mechanically contract, expand, or vibrate responsive to electrical energy applied. In some cases, electropolymer elements 220, 222 include multiple elements of ionic polymer gels, which can be transparent or opaque. Alternately or additionally, electropolymer elements 220, 222 may be fabricated from any suitable number of ionic polymer gel elements, which may be layered directly with adjacent other elements or separated with a suitable flexible substrate or membrane. For example, elements of ionic polymer gel may be separated by an insulating, semi-conductive, or conductive element of flexible material (e.g., polymer or polyimide based materials).

In some embodiments, two or more ionic polymer gel elements of electropolymer elements 220, 222 have electrical contacts by which electrical energy is applied at different locations (e.g., through control element 226). For example, some portions of the ionic polymer gel may have electrical contacts located at various longitudinal locations and other elements of the ionic polymer gel may have electrical contacts located at various latitudinal locations. In some cases, a portion of the ionic polymer gel may have a variety of electrical contacts at longitudinal and latitudinal locations that are same as, or different from, locations of electrical contacts on another element. Having a wide array of electrical contacts at which electrical energy can be applied may be effective to enable precise or efficient control of mechanical action, and thus projections produced by electropolymer elements 220, 222.

Touch element 224 is configured to receive touch input. Touch element 224 can be configured to receive this touch input directly or indirectly, such as through capacitive proximity sensors, resistive sensors, pressure sensors, thermal sensors, and other touch or gesture-sensitive techniques known in the art. Touch element 224 may include voids through which haptic guides can be provided by one of electropolymer elements 220, 222. These haptic guides are capable of differentiating regions of touch element 224, such as selecting touch-sensitive controls 114 of touch-sensitive display 116 on outer surface 112 (shown in FIG. 1). By so doing, touch element 224 is configured to receive touch input through the regions of touch element 224 using haptic guides provided through the multiple voids.

Control element 226 is configured to actuate and de-actuate one or both of electropolymer elements 220, 222. In some cases control element 226 is an electroactive polymer actuator array configured to actuate portions of the electropolymer elements 220, 222, though control element 226 may also or instead use an electromechanical actuator array to provide mechanical actuation effective to cause projections of electropolymer elements 220, 222. Haptic controller 218, for example, may cause power source 206 to apply a voltage signal through an actuator array of control element 226 effective to expand portions of inner electropolymer element 220 through voids in touch element 224 of outer surface 112 to provide haptic guides in visual display surface 228.

Control element 226 may also sense contact with the actuated portions, such as through deformation of a haptic guide or other projections. Thus, on receiving touch input deforming one or more haptic projections, control element 226 may sense the deformation through an electric signal, pass this information (e.g., an electric signal) to haptic controller 218, which may in turn determine a user's gesture.

Haptic device 210 can include various different combinations of these and other elements, examples of which are illustrated in FIGS. 3-10 and described below.

Figure 3:
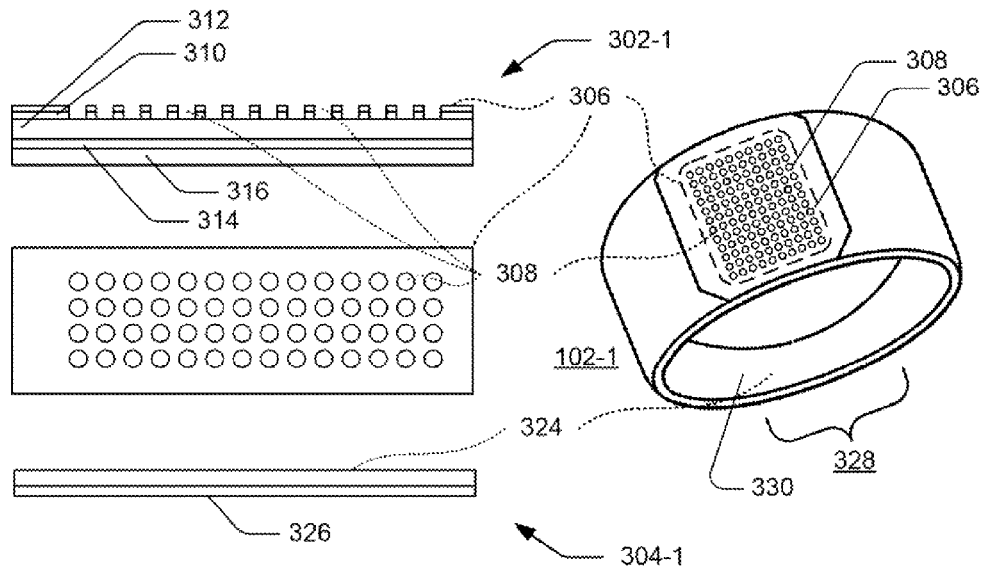
FIG. 3 illustrates a computing bracelet with example haptic devices, both shown in unactuated and actuated states.
Figure 3:
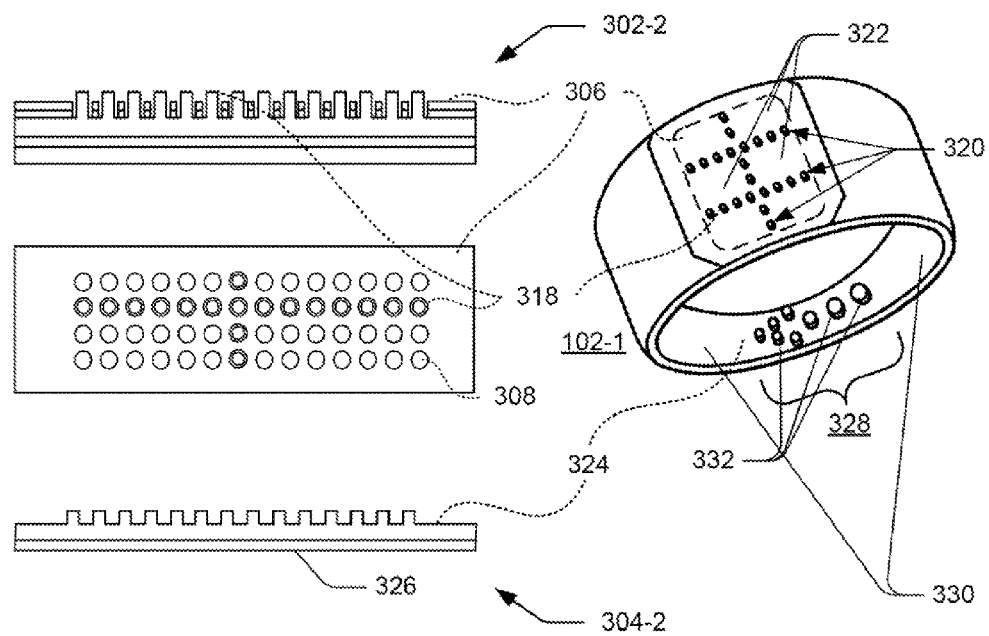

FIG. 3 illustrates computing bracelet 102-1 with example haptic devices 302 and 304, both shown in unactuated and actuated states at 302-1, 304-1 and 302-2, 304-2, respectively. Haptic device 302 includes a touch element 306 having multiple voids 308 (both shown in cross-section and plan views) with an adhesive element 310 connecting touch element 306 to an outer electropolymer element 312. Outer electropolymer element 312 includes an integral control element (not shown) and is attached, with another adhesive element 314, to a substrate 316. When actuated, one or more portions of outer electropolymer element 312 are expanded. This expansion causes projections 318 through voids 308, which extend beyond touch element 306. This is shown for the actuated state of haptic device 302 shown at 302-2.

Note that these projections can form haptic guides by which various regions of a touch element can be selected. In this illustration, haptic guides 320 differentiate six selectable regions 322 of touch element 306.

Haptic device 304 includes an inner electropolymer element 324 having an integral control element (not shown) and a substrate 326. Haptic device 304 is configured to provide haptic output through a skin-contact region 328 of an inner surface 330 of computing bracelet 102-1. When actuated, one or more portions of inner electropolymer element 324 are raised to create projections 332. As noted herein, these projections can be relatively large compared to projections 318 formed through voids 308. As these projections 332 are felt on a user's skin (e.g., passively, rather than through movement of a finger), larger projections, movement of projections, and so forth can be useful in conveying content to a user.

Haptic devices 302 and 304 are physically separate, though this is not required. Thus, inner surface 108 and outer surface 112 can be integrated in a cohesive stack, the cohesive stack comprising touch element 224 of outer surface 112, which is configured to receive touch input, and skin-contact region 110 of inner surface 108, which is configured to output data through haptic projections.

Figure 4:
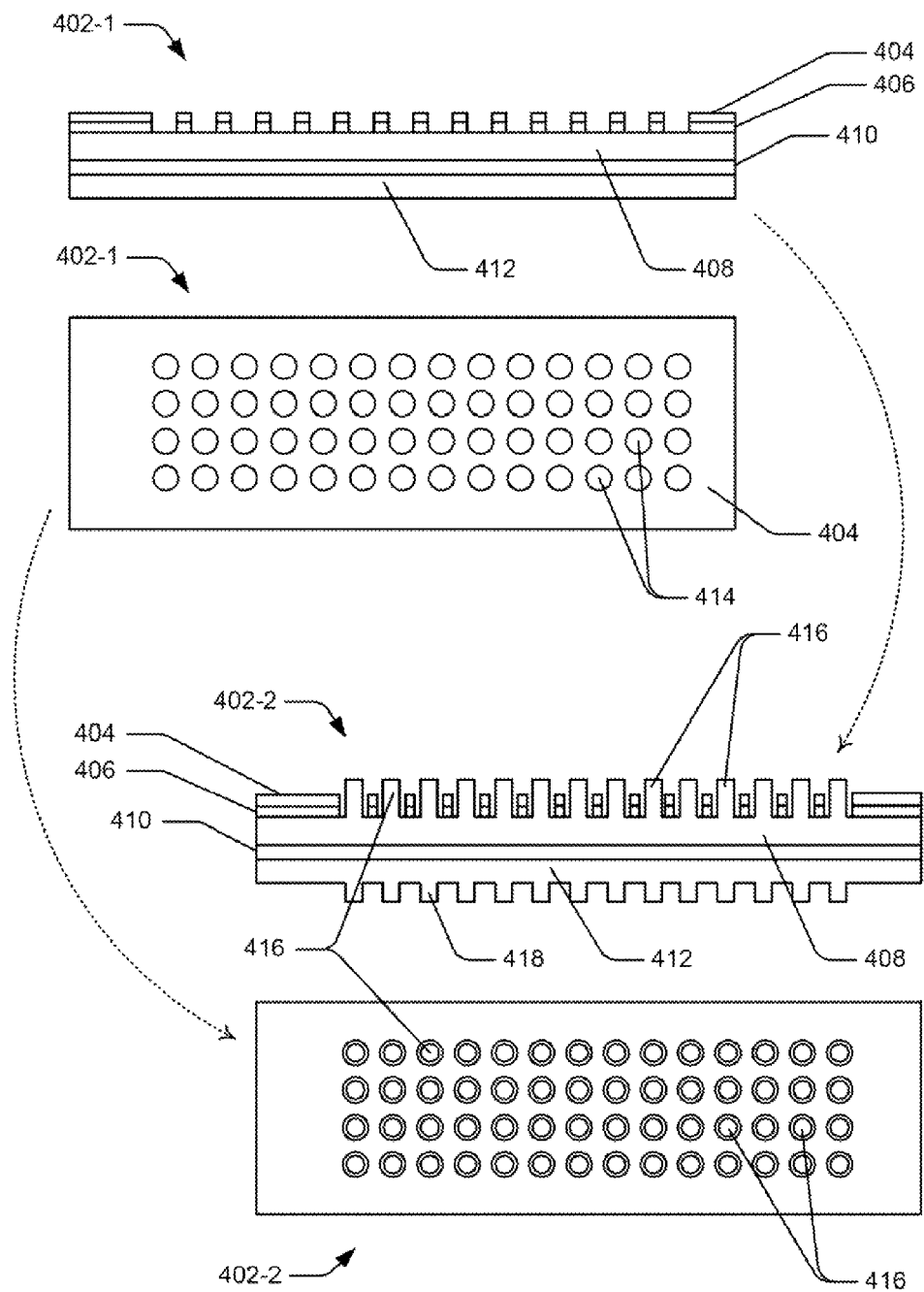
FIG. 4 illustrates an example dual-side haptic device.
Figure 5:
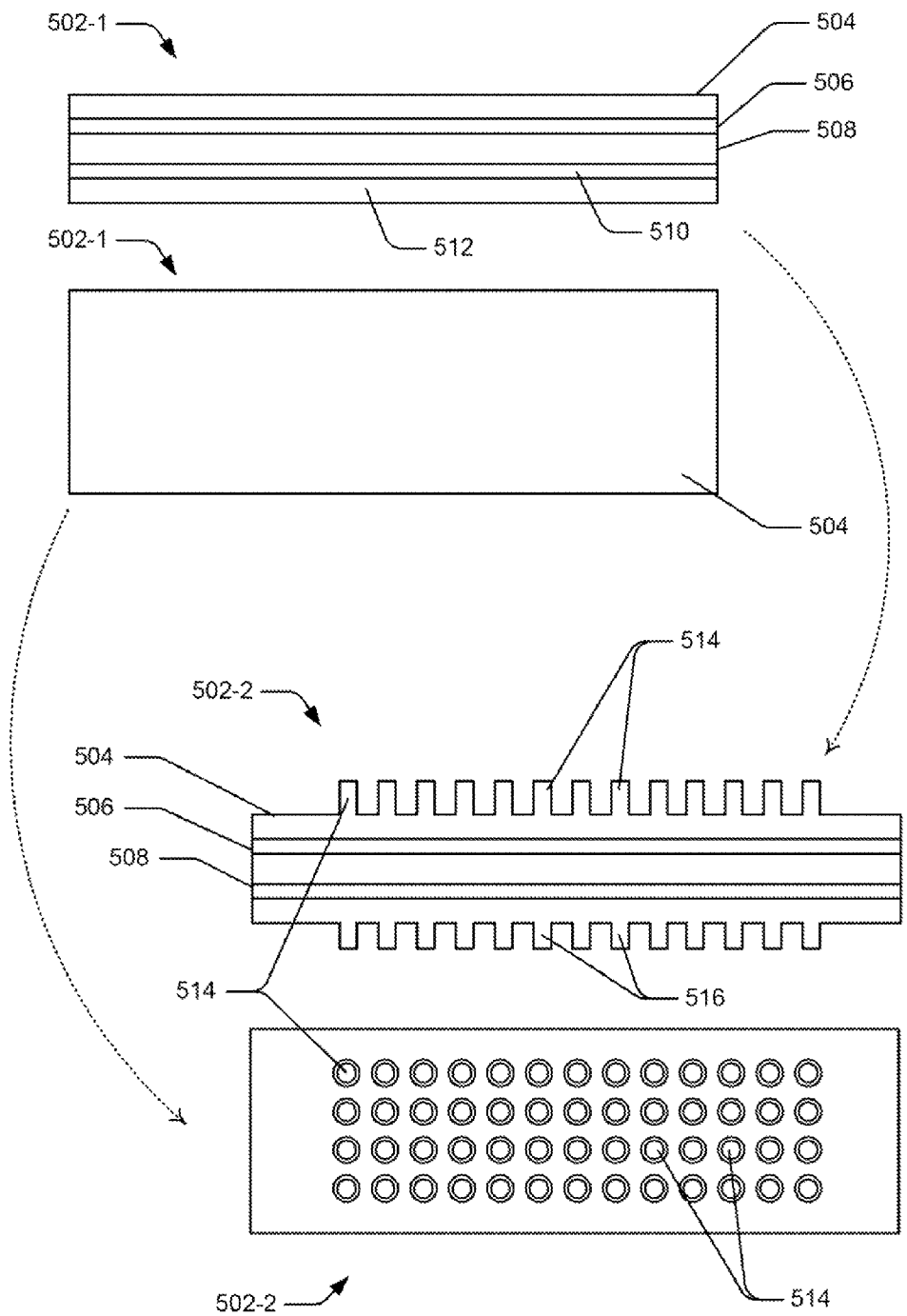
FIG. 5 illustrates another example of a dual-side haptic device.

In more detail, FIGS. 4 and 5 illustrates dual-side haptic devices having surface integrated into a cohesive stack. These dual-side haptic devices have a skin contact region of an inner surface of communication device 102 on an opposite side of a touch surface (e.g., on the underside of a touch element).

FIG. 4 illustrates an example dual-side haptic device 402 having a touch element 404, an adhesive element 406, an outer electropolymer element 408, another adhesive element 410, and an inner electropolymer element 412. Dual-side haptic device 402 is shown in an unactuated state at 402-1 and an actuated state at 402-2, both in cross section and plan views (shown touch element 404 but not inner electropolymer element 412).

Similarly to as illustrated in FIG. 3, portions of electropolymer elements are expanded or raised, such as through voids 414 in touch element 404 to provide projections 416 or without voids, shown at projections 418. Projections 418 are provided to a user's skin, such as a wrist or finger in the case of a wearable computing ring 102-2.

FIG. 5 illustrates another example of a dual-side haptic device, here dual-side haptic device 502 having an outer electropolymer element 504, an adhesive element 506, an internal touch element 508, another adhesive element 510, and an inner electropolymer element 512. Dual-side haptic device 502 is shown in an unactuated state at 502-1 and an actuated state at 502-2, both in cross section and plan views (showing outer electropolymer element 504 but not inner electropolymer element 512). Portions of electropolymer elements 504 and 512 are expanded or raised (without use of voids) to provide projections 514 at an outer surface (without use of voids) and projections 516 at an inner surface. Projections 516 are provided to a user's skin, while projections 514 can be sensed by passing or pressing a fingertip, for example, over them. Note that internal touch element 508 is configured to receive selections, such as through capacitive or pressure. This internal touch element 508, in some cases, includes display functionality. In this case or with a separate internal touch element 508 and display surface, outer electropolymer element 504 resides over the display. In this case outer electropolymer element 504 is at least partially transparent effective to enable the display residing beneath it to be visible.

While the example actuated states shown in FIGS. 4 and 5 show many projections, these are for illustration purposes, as projections can be selectively provided through haptic controller 218 and control element 226.

Figure 6:
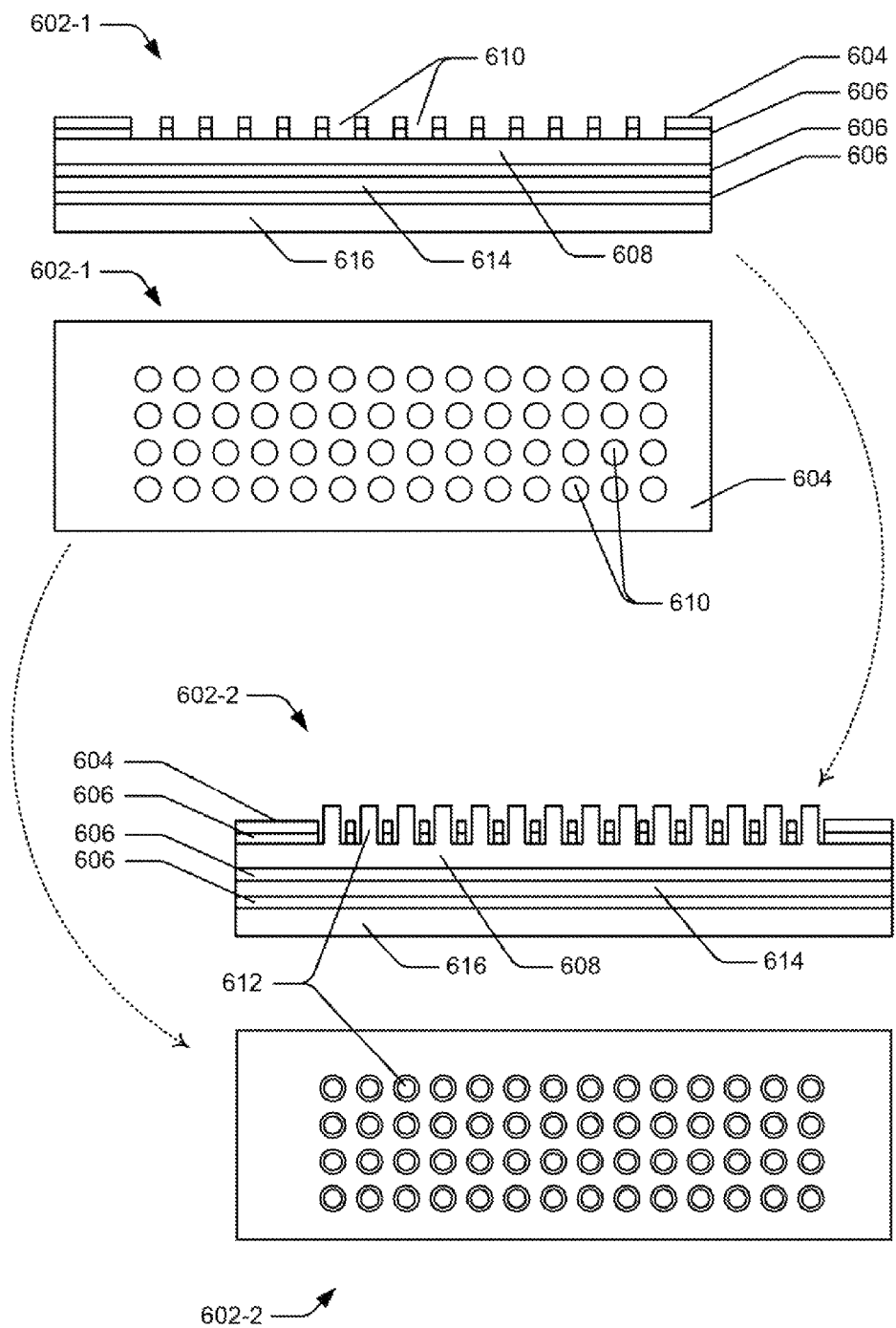
FIGS. 6, 7, and 8 illustrate three other example haptic devices, each of these having an outer surface with a touch element, which may be integral with a touch-sensitive display.
Figure 7:
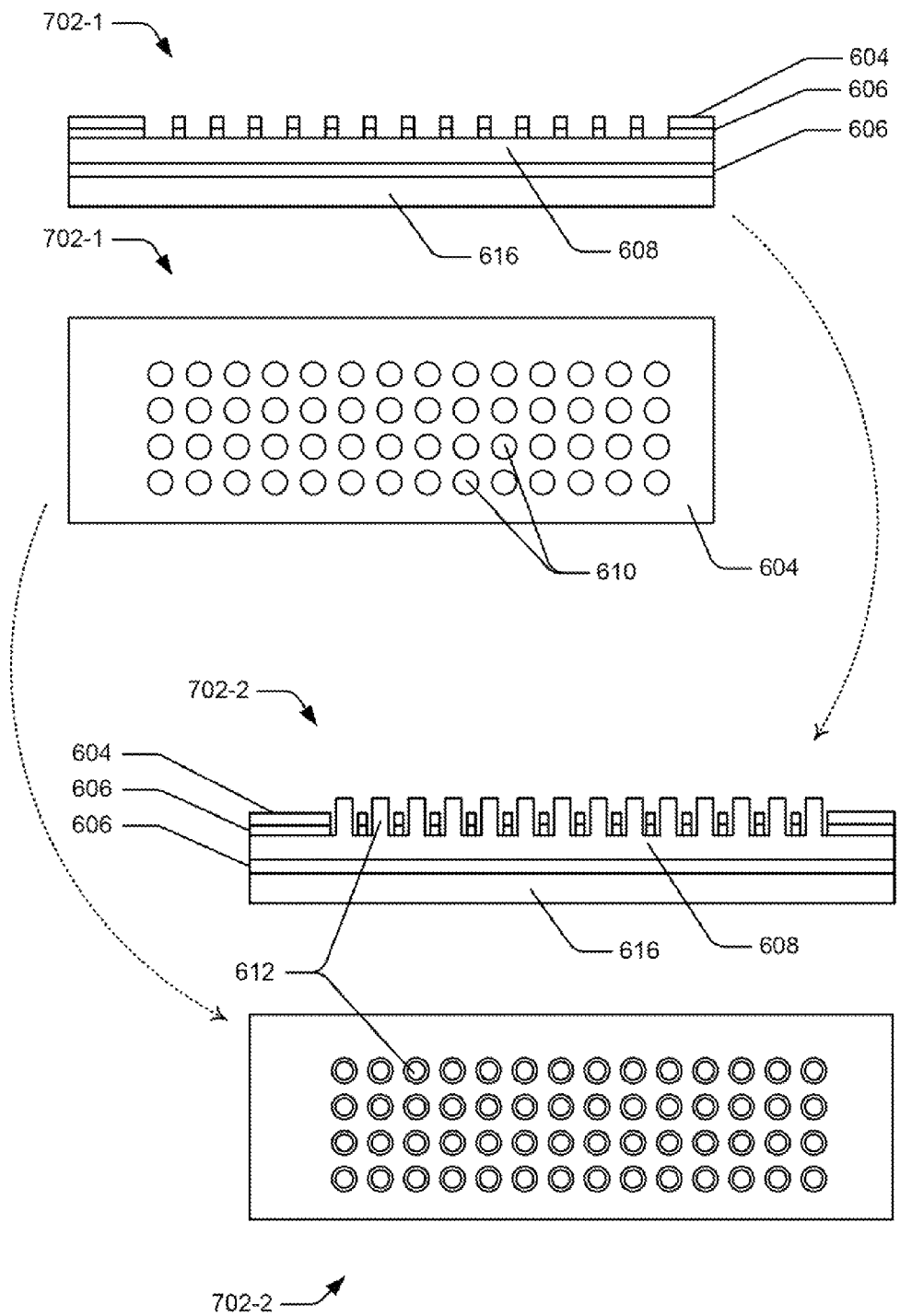
Figure 8:
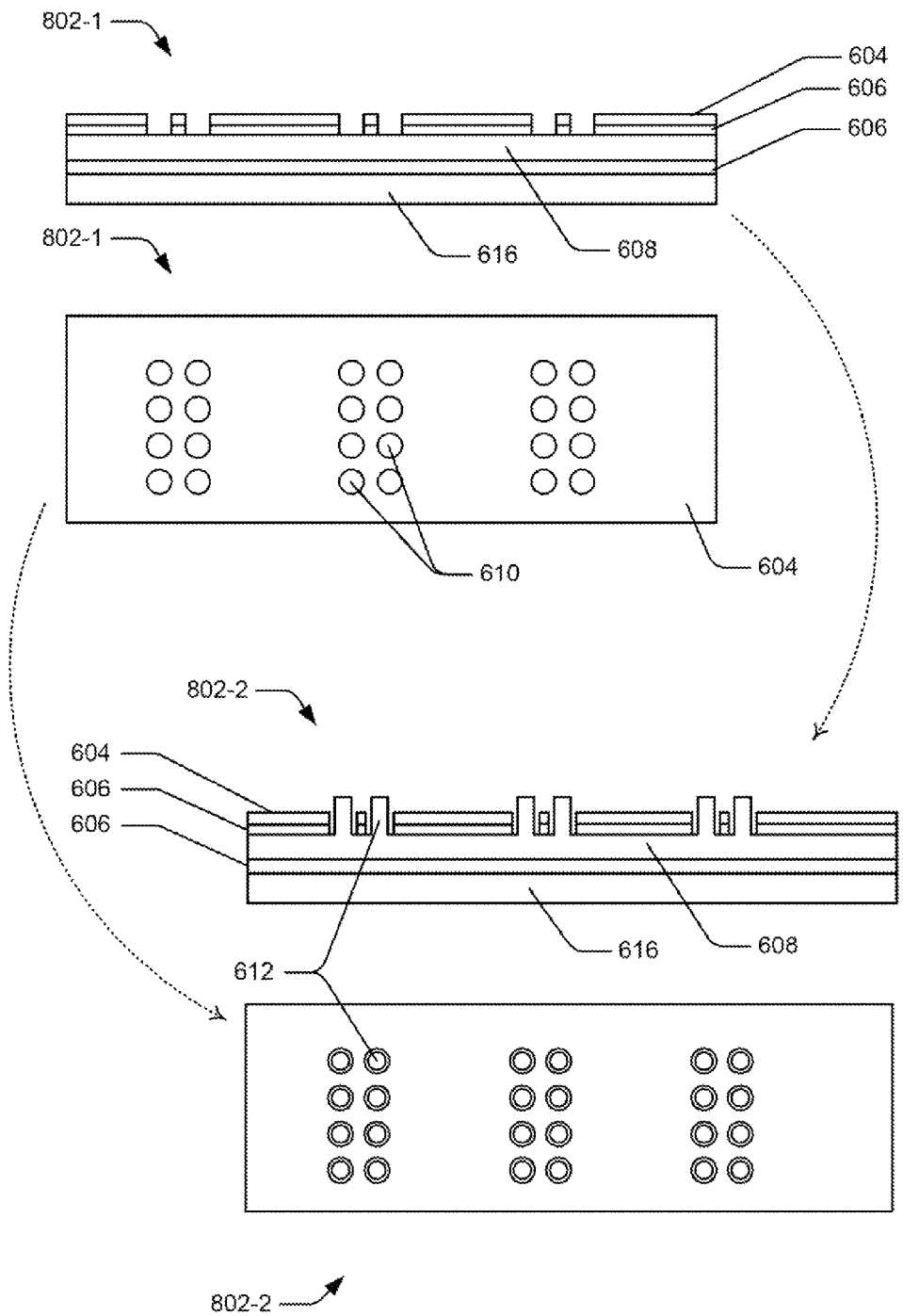

FIGS. 6, 7, and 8 illustrate three other example haptic devices, each of these having an outer surface, such as outer surface 112 of FIG. 1, with a touch element (e.g., touch element 224), which may be integral with a touch-sensitive display (e.g., touch-sensitive display 116). These haptic devices can be integrated with the various other haptic devices providing projections to an inner surface (e.g., dual-side haptic devices 402 or 502), be separate from these haptic devices (e.g., 302 and 304 of FIG. 3), or be part of a device not using a haptic device providing projections to an inner surface.

As noted, FIGS. 6, 7, and 8 illustrate three example haptic devices 602, 702, and 802, each of which is shown in unactuated and actuated states (602-1, 602-2, 702-1, 702-2, 802-1, and 802-2, respectively). Each of haptic devices 602, 702, and 802 includes a touch element 604, adhesive elements 606, and an outer electropolymer element 608. Each also includes voids 610 and projections 612 through those voids 610. Haptic device 602 also includes an electro-mechanical element 614 to provide vibration and sound, as well as a substrate element 616, though substrate element 616 is not required. Haptic device 702 also includes substrate element 616, but excludes electro-mechanical element 614. Haptic device 802 includes the elements of haptic device 702 but has one of many potential arrangements for voids 610. Electro-mechanical element 614 may provide mechanical output, such as a shake or pulse, and may be made of a layered electroactive polymer, for example.

Figure 9:
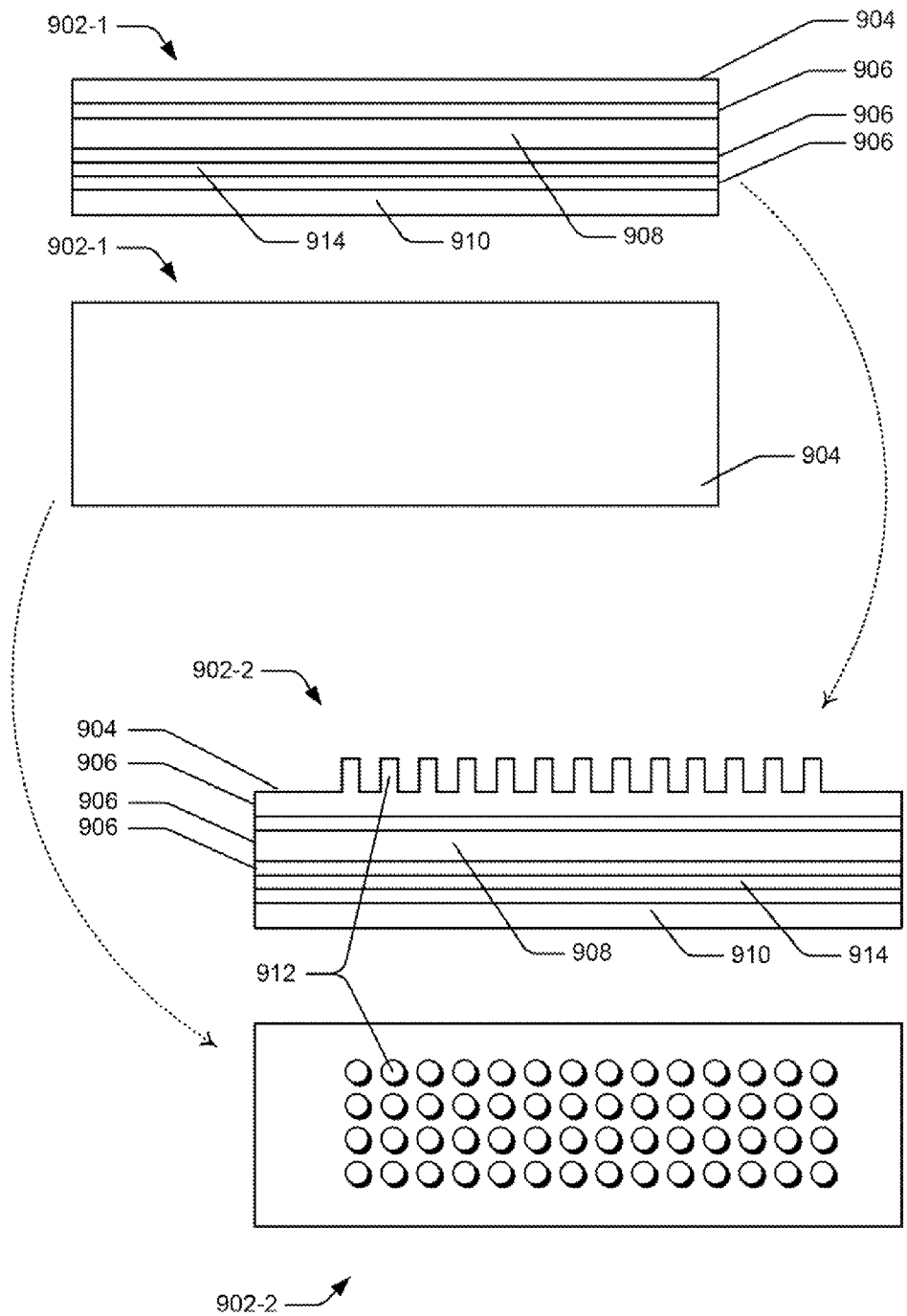
FIGS. 9 and 10 illustrate two additional example haptic devices, each of these having an outer surface having an outer electropolymer element.
Figure 10:
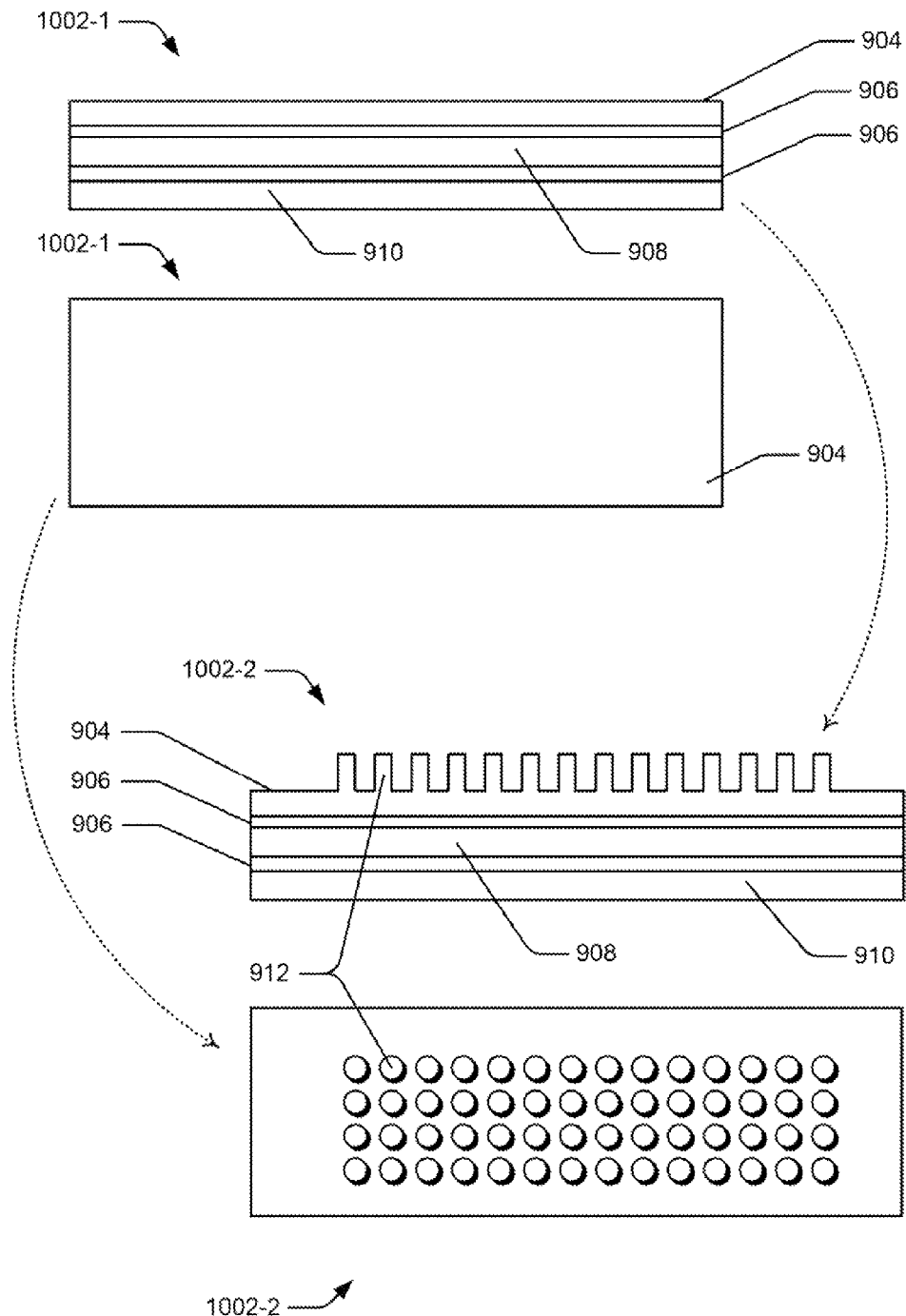

FIGS. 9 and 10 illustrate two additional example haptic devices, haptic devices 902 and 1002, each of these having an outer surface, such as outer surface 112 of FIG. 1, but instead of a touch element, an outer electropolymer element is on outer surface 112. In contrast to examples of FIGS. 6-8, the touch element (e.g., touch element 224) is placed within and beneath an outer electropolymer element.

These haptic devices 902 and 1002 can be integrated with the various haptic devices providing projections to an inner surface (e.g., dual-side haptic devices 402 or 502), be separate from these haptic devices (e.g., 302 and 304 of FIG. 3), or be part of a device not using a haptic device providing projections to an inner surface.

Haptic devices 902 and 1002 are shown in unactuated and actuated states (902-1, 902-2, 1002-1, 1002-2, respectively). Each of haptic devices 902 and 1002 includes an outer electropolymer element 904, adhesive elements 906, an internal touch element 908, and a substrate 910. Each is configured to provide projections 912 without use of voids. Haptic device 902 also includes an electro-mechanical element 914 to provide vibration and sound, and may be similar or identical to electro-mechanical element 614 as described above. Haptic device 1002 excludes electro-mechanical element 914 and one element of adhesive 906.

Before turning to example methods for communications through a communication device having haptic guides, the discussion provides an overview of example remote computing devices 104, first illustrated in environment 100 of FIG. 1.

Figure 11:
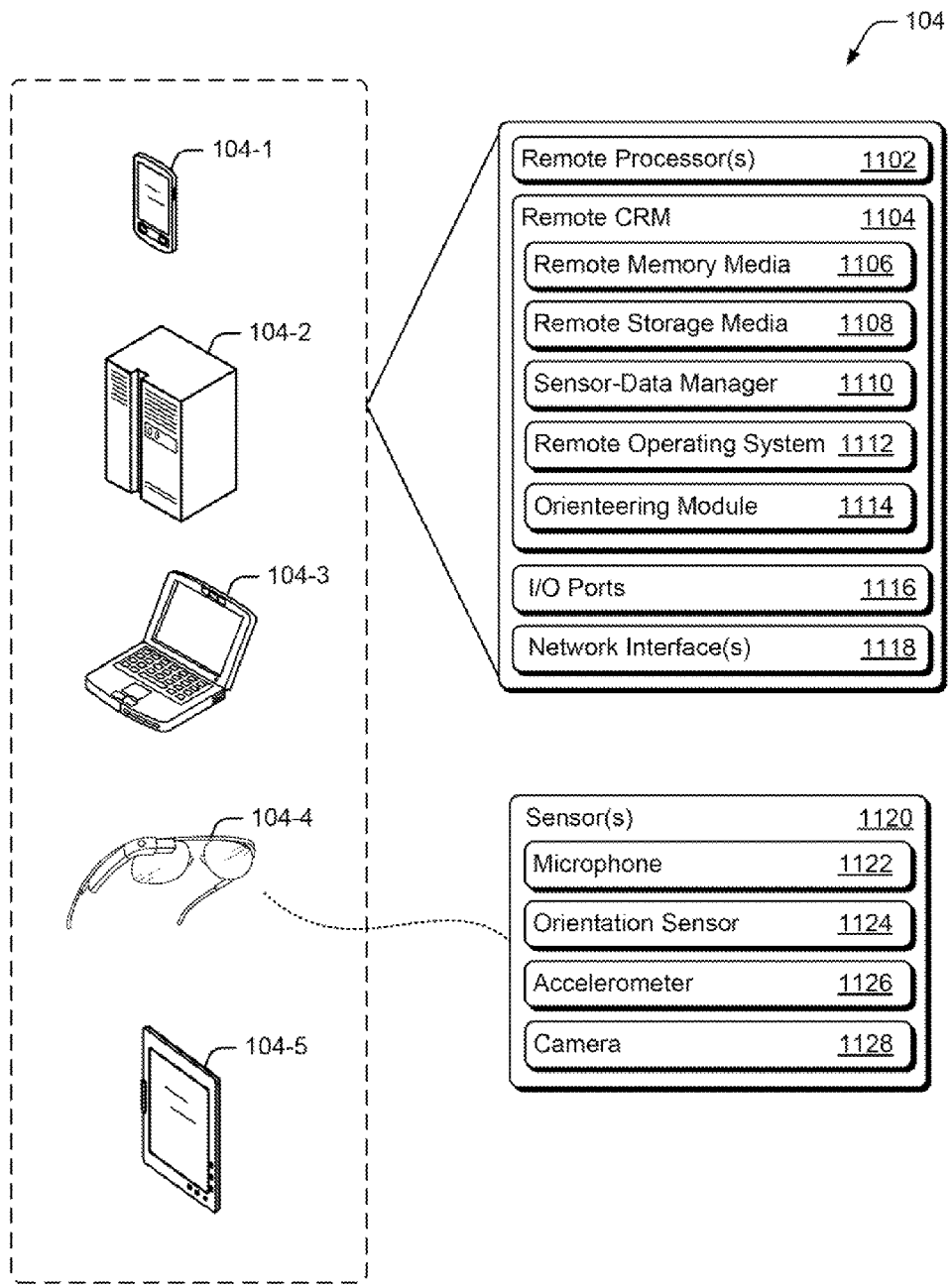
FIG. 11 illustrates a detailed example of the remote computing device of FIG. 1.
Figure 12:
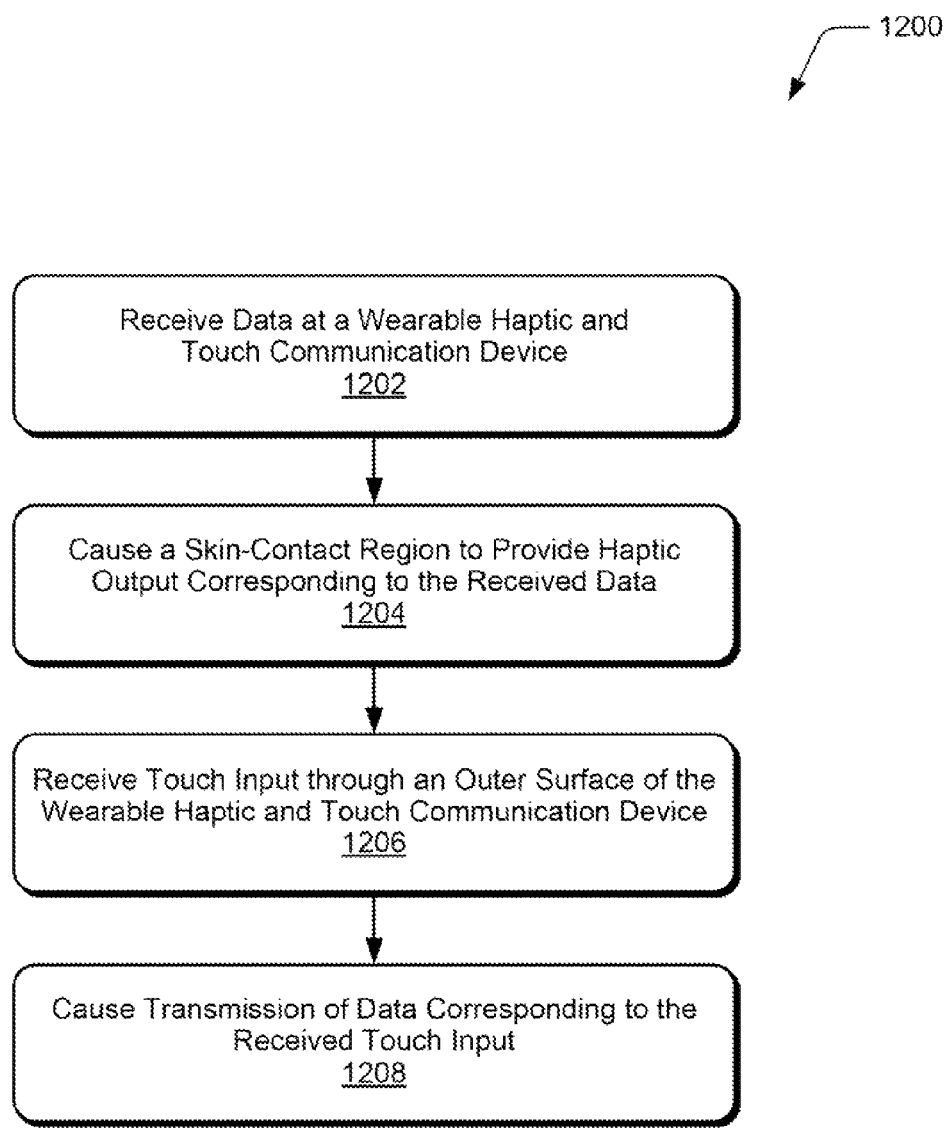
FIG. 12 illustrates an example method that enables data output and touch input through a communication device.
Figure 13:
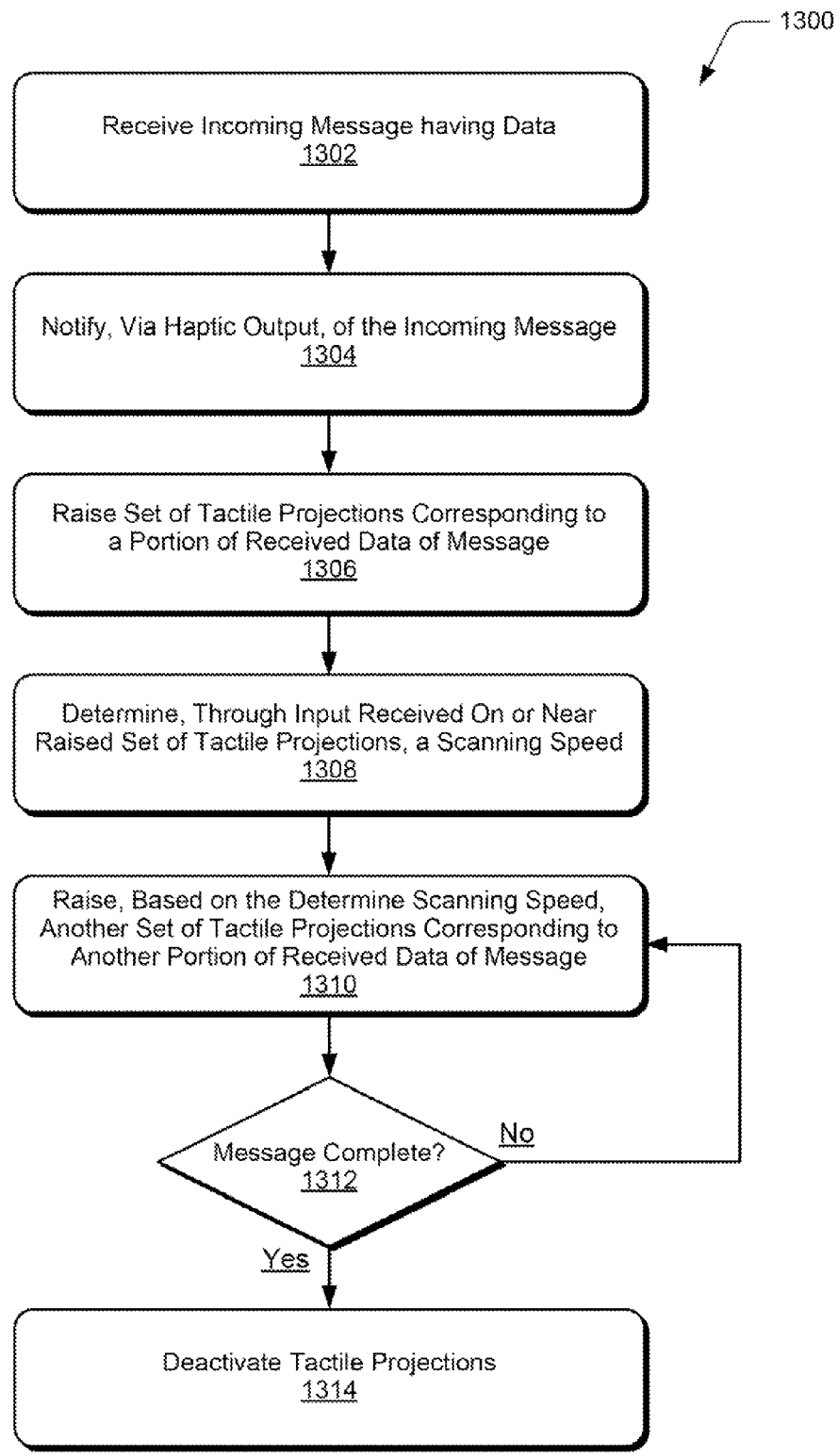
FIG. 13 illustrates an example method that enables message output through a wearable haptic device, in some embodiments for visually impaired or visually occupied persons.

FIG. 11 illustrates a detailed example of remote computing devices 104, along with various examples of different types of remote devices, including smartphone 104-1, server 104-2, laptop 104-3, computing spectacles 104-4, and tablet 104-5. Remote computing device 104 includes one or more remote processors 1102, remote computer-readable storage media (remote CRM) 1104, remote memory media 1106, remote storage media 1108, sensor-data manager 1110, remote operating system 1112, and orienteering module 1114. Remote computing device 104 also includes input/output ports 1116 and networks interfaces(s) 1118.

In some cases, remote computing device 104 includes, or receives information from, sensors 1120. Sensors 1120 may include one or more microphones 1122, orientation sensors 1124, accelerometers 1126, and/or cameras 1128. Thus, server 104-2 may receive camera data indicating an obstruction to a wearer of a wearable haptic device, or computing spectacles 1044 may include camera 1128 and thus sensor data indicating objects in proximity to a user, or smartphone 104-1 may include accelerometer 1126 and orientation sensors 1124 by which to determine a user's walking direction or speed.

Sensor-data manager 1110 is capable of recording, analyzing, tracking, and/or providing sensor data sensed by sensors 1120 to orienteering module 1114. Orienteering module 1114 is capable of providing data to communication device 102 of FIG. 1. This data can be communicated to a wearer of the communication device (e.g., user 106) through haptic output, such as object-proximity data to indicate to a wearer of an obstruction impeding a current direction of the wearer, a map of various objects that may impede the wearer, and so forth.

Example Methods

The following discussion describes methods by which techniques are implemented to enable communication. These methods can be implemented utilizing the previously described environment, such as shown in FIGS. 1-11. Aspects of these example methods are illustrated in FIGS. 12, 13, 15, 16, and 17, which are shown as operations performed by one or more entities. The orders in which operations of these methods are shown and/or described are not intended to be construed as a limitation, and any number or combination of the described method operations can be combined in any order to implement a method, or an alternate method.

Method 1200 enables data output and touch input through a communication device. At 1202, data is received through a network interface of a communication device. Various examples of types of data are described herein, such as data about a physical obstruction, a text or email message, and so forth. Also, this data can be received through various manners, including via a personal-area network and from a computing device communicatively linked to the communication device, such as computing spectacles 104-4, which may provide obstruction data sensed by camera 1128 and provided by orienteering module 1114.

At 1204, a skin-contact region of the communication device is caused to provide haptic output, the provided haptic output corresponding to the received data. In some cases, the haptic output includes pulses, vibration, or projections of various shapes. In such cases, the haptic output may be directional, such as an undulating or rolling projection that is capable of indicating a direction, change in proximity (e.g., by varying a pulsing or vibrational rate), or warning to a user wearing the communication device.

At 1206, touch input is received through an outer surface of the communication device. As noted above, this outer surface can include a touch-sensitive visual display, touch-sensitive buttons, or touch-sensitive haptic projections. Thus, a display may be integral with the selection (e.g., visual display controls with or without touch-sensitive haptic projections) or a display may not be used.

At 1208, the network interface is caused to transmit data corresponding to the received touch input. This input can be a response to the data that was output, such as a yes or no response to a text, email, or other query, for example.

Methods 1300 enable message output through a wearable haptic device, in some embodiments for visually impaired or visually occupied persons. At 1302, a message having content is received at a wearable haptic device. Note that this wearable haptic device does not necessarily have to receive and provide input, though that is permitted. Content can be of various types, such as content that can be presented through symbols or characters of a language.

Figure 14:
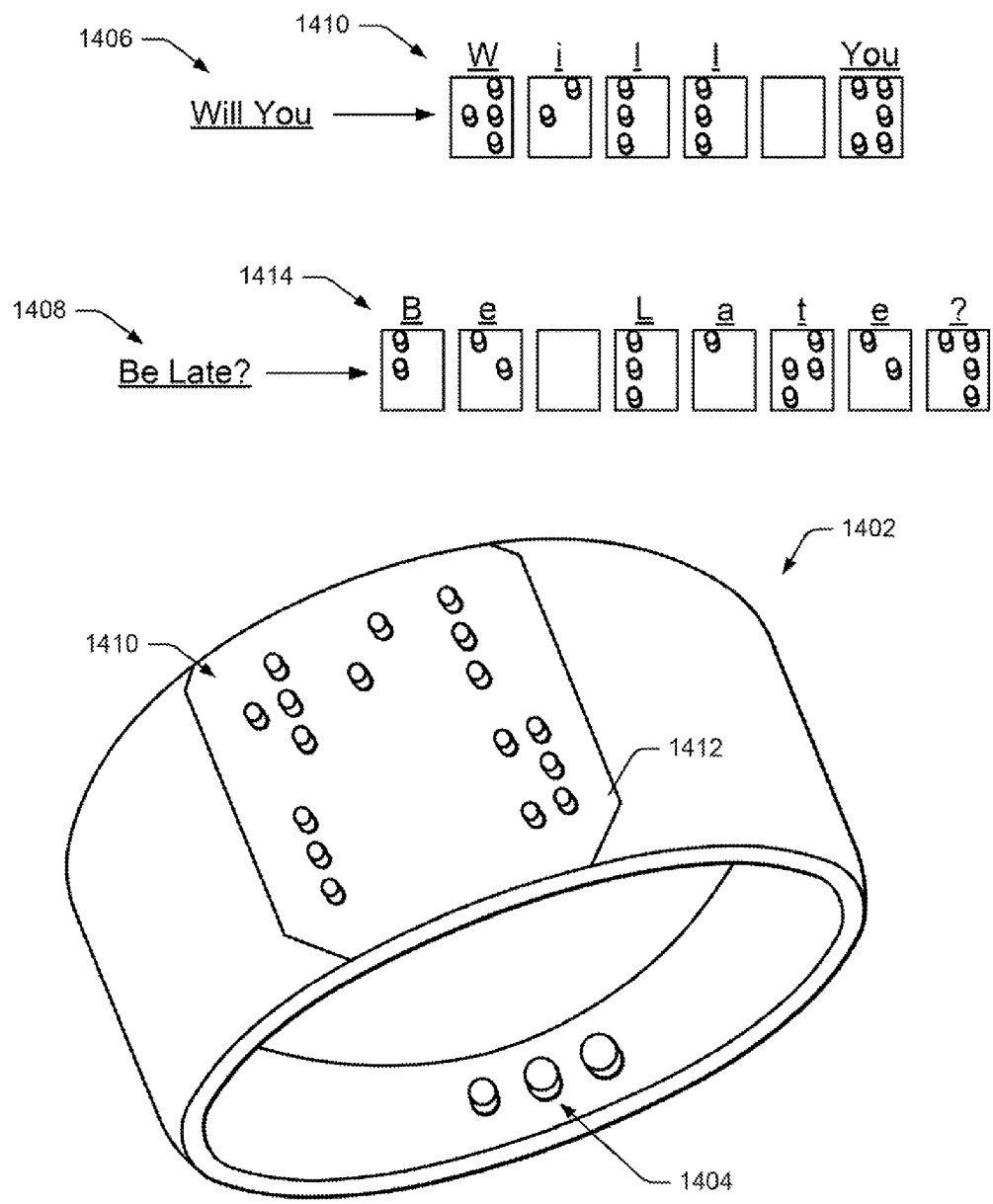
FIG. 14 illustrates a wearable haptic and touch device having projections and braille text symbols.
Figure 15:
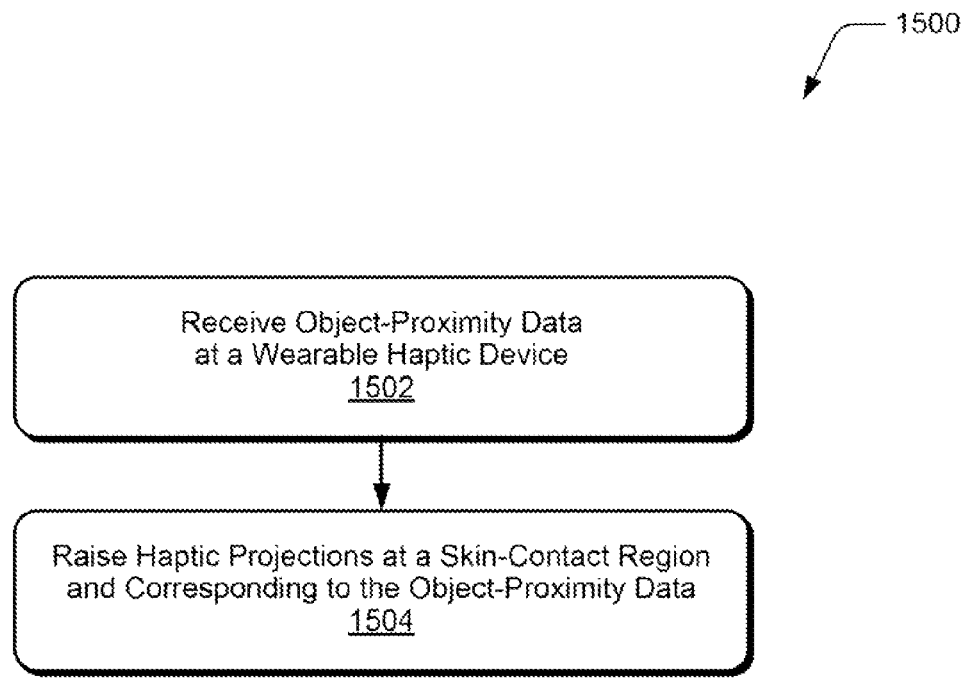
FIG. 15 illustrates an example method enabling use of haptics to present object-proximity data.
Figure 16:
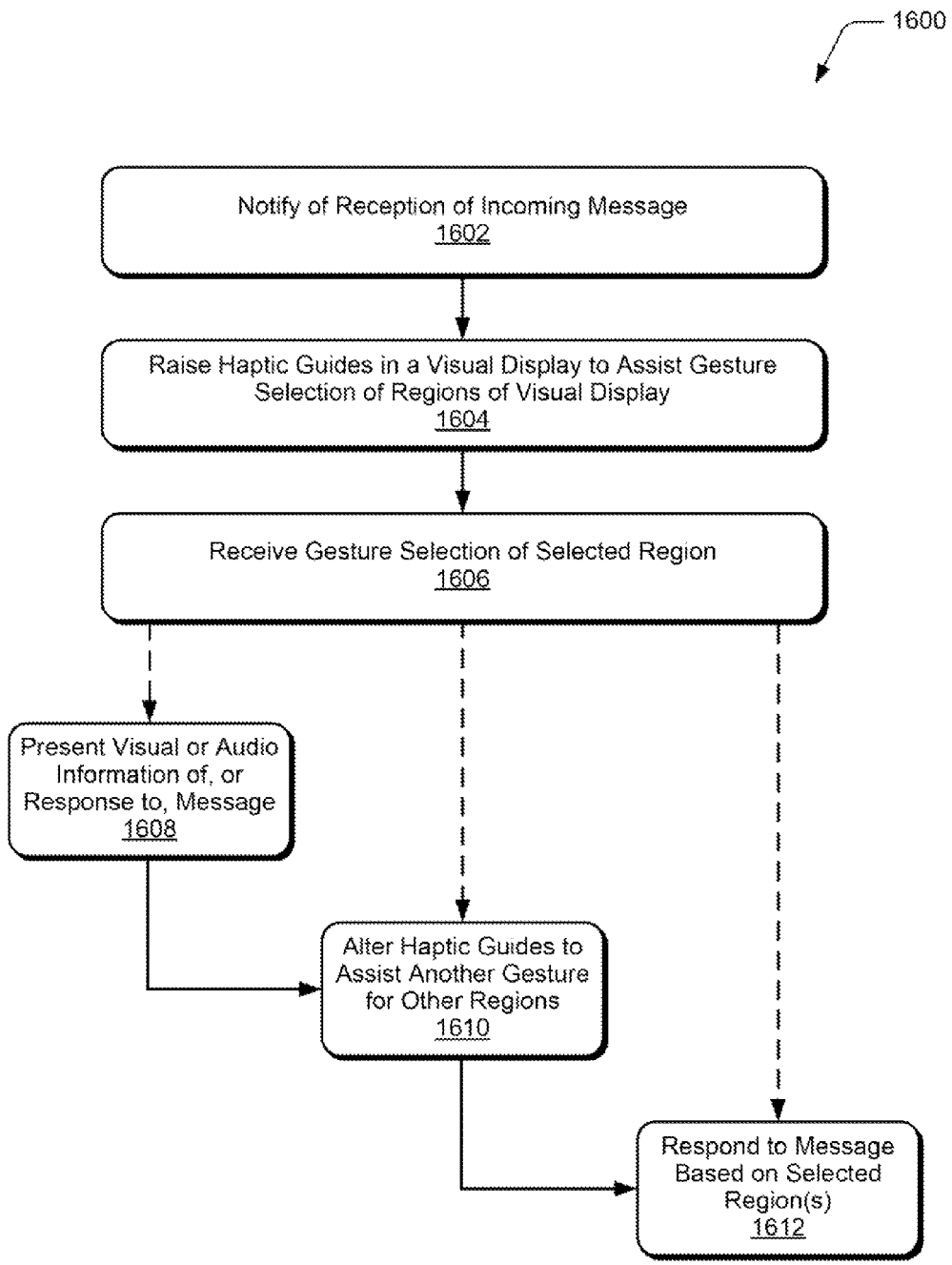
FIG. 16 illustrates an example method enabling haptic guides for use with a touch-sensitive display.
Figure 17:
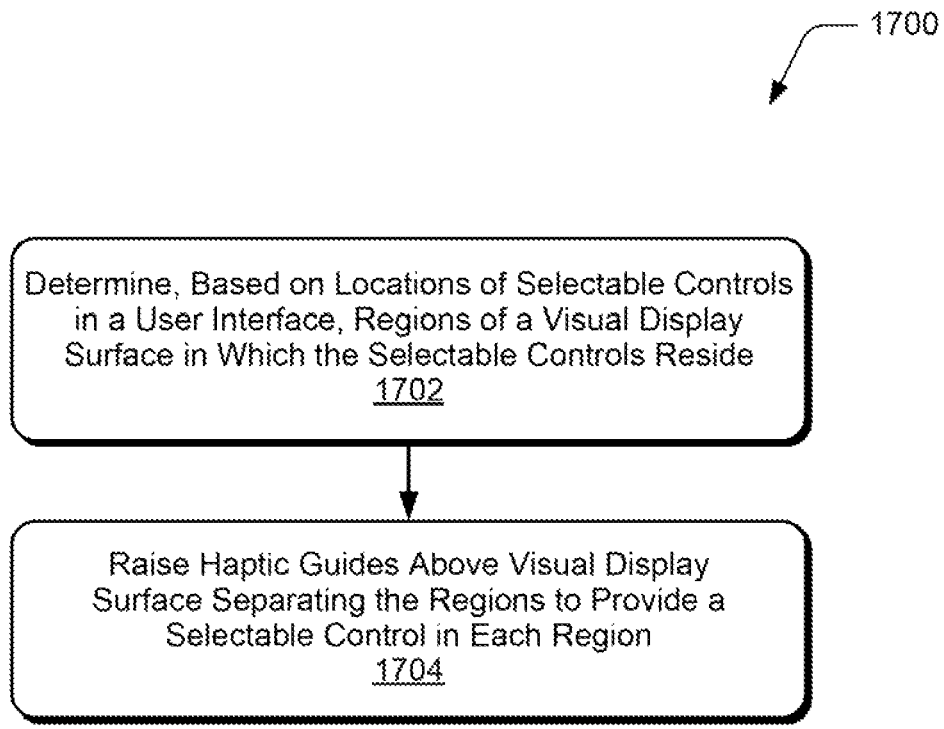
FIG. 17 illustrates use of haptic guides separating regions to provide a selectable control in each region.

At 1304, reception of the message is indicated via haptic output. Reception of the message can be indicated through shaking, vibrating, or pulsing (e.g., using electro-mechanical element 914 of FIG. 9 or vibrator 122 of FIG. 1). This indication can also be indicated by causing a skin-contact region to provide projections (e.g., points) at an inner surface of a wearable haptic device configured to be felt by human skin. This is illustrated by FIG. 14, which shows a wearable haptic device 1402 having three large projections 1404. Here assume that three large projections 1404 indicates reception of a message, though various types of projections and orientations can be used to represent various messages or types of messages.

At 1306, a set of tactile projections corresponding to a portion of the content are raised. These tactile projections can be raised in the various manners noted above, such as through voids or without voids, and as points, ridges, or other projections.

These tactile projections can represent text or symbols, such as standard-language text or symbols representing the content. Continuing the ongoing example, consider content of "Will you be late?" for a message. Assume that a first portion 1406 of the message is "Will you" and a second portion 1408 is "be late?". For first portion 1406, assume that braille text symbols 1410 are determined (e.g., by haptic controller 218) and raised at an outer surface 1412 of wearable haptic device 1402. These six braille symbols 1410 include eight English-language characters (including the space), though the word "You" has a single symbol.

At 1308, a scan speed through input received through a scanning touch is determined. This scan speed can be determined based on a speed or rate at which some of the tactile projections are touched, felt, or scanned over by a user "reading" the message. Continuing the ongoing example, assume that a user passes his finger over the first three symbols of the six braille symbols 1410 (for "W", "i", and "l") at an average of 0.15 seconds per symbol.

At 1310, a second set of tactile projections corresponding to a second portion of the content is raised based on the determined scanning speed. Thus, if the scan speed is 0.15 seconds per symbol, additional symbols can be presented at that scan speed. This can simply govern how fast a second set of braille symbols 1414 are raised to replace the first set of braille symbols 1410, or symbols can be lower and new symbols raised one at a time or by sub-portions. Thus, the first three symbols can be replaced with first three symbols of the second set after 0.45 seconds have passed, and so forth.

As noted in part above, input can be sensed through various manners, and thus the scan speed can be determined based on capacitive touch input speeds received over an outer touch element integral with the first set of tactile projections, or based on movement over, or contact with, the first set of tactile projections.

Method 1300 can repeat operations to complete the message or, if the message is complete at operation 1312, proceed to deactivate the tactile projections at 1314. Deactivating the tactile projections can be a function of the scan speed and a last portion of the message being raised, a duration of time elapsing, explicit selection to lower the respective set of tactile projections, or a determination that symbols corresponding to the tactile projections have been read (e.g., through touch input over the tactile projections).

Method 1300 may present text, whether braille or otherwise, as a succession, the succession based on a speed and direction of a language corresponding to the text. Thus, for most European languages, from top to bottom and then from left to right. Some other world languages, however, follow different directions, which can be determined and used by haptic controller 218.

Method 1500 is directed to using haptics to present object-proximity data, such as to a visually-impaired person. At 1502, object-proximity data is received at a wearable haptic device. This object-proximity data may indicates an obstruction impeding a current direction of a user associated with the wearable haptic device, and thus enable the user to avoid walking into the obstruction. For example, data can be received from computing spectacles 104-4 indicating a direction and distance from an object.

At 1504, tactile projections are raised at a skin-contact region of the wearable haptic device, the tactile projections corresponding to the object-proximity data. This object-proximity data can be presented as, or with, a warning, such as with three haptic projections 1404 of FIG. 14, or with an indication of what to do to avoid the obstruction, such as haptic output of an arrow (shown in FIG. 1). By so doing, haptic controller 218 permits a user to walk without having to see, freeing those that are visually impaired to more-freely move about.

This object-proximity data may also or instead include a map. This map may indicate multiple objects and distances from the wearable haptic device. In such a case, haptic controller 218 may raise tactile projections in a manner to present the location or size relative to the user. Thus, at a skin contact region 110, objects can be represented at their size, location, and/or distance from the wearer. Note also that an orientation change by a user, such as by turning his or her head when wearing a camera from which the object-proximity data is received (e.g., computing spectacles 104-4) can cause the object-proximity data to change and thus cause the tactile projections to change. This process can aid visually-impaired users to quickly understand where objects are relative to the user, including distance and angle.

In some cases a warning or additional warning is provided, such as when a user is very near an object. In such a case, haptic controller 218 may shake or pulse the wearable haptic device as noted above.

Method 1500 may operate alone or in conjunction, in whole or in part, with other methods set forth herein. Thus, object-proximity data can be output to a user through a skin-contact region while also providing touch-recognizable text (e.g., braille text symbols) either at a same skin-contact region or through an outer region, such as described for method 1300 and shown in FIG. 14.

Method 1600 enables haptic guides for use with a touch-sensitive display. Method 1600 does not require use of a wearable device, but instead may be used with various devices having or using a touch-sensitive display, such as tablet computers, laptops, and smartphones.

At 1602 reception of a message is notified through a computing device. This message can be through the various communication networks and manners noted herein, such as through an email, social media, or SMS communication. This reception can be notified through haptic output at a surface of the computing device (e.g., projections 1404 at skin contact region 110), a shake or pulse as noted above, or through the visual display.

At 1604, haptic guides of a visual display of the computing device are raised. The haptic guides are configured to assist gesture selections of regions of the visual display.

At 1606, a gesture selection of a first region of the visual display is received. Responsive to reception of the gesture, one or more of operations 1608, 1610, or 1612 are performed. At 1608, visual or audio information associated with the message or a potential response to the message is presented. This presentation is based on the gesture selection of the first region.

At 1610, the haptic guides are altered, based on the gesture selection of the first region, to assist in another gesture selection of another region of the visual display.

At 1612, the message is responded to based on the gesture selection of the first region. Consider an example where operations 1608, 1610, and 1612 are performed. Assume that a user selects, through a gesture selection, one of controls 114 of FIG. 1. On reception, haptic controller 218 alters the haptic guides to present other selectable controls, and the after receiving another gesture selection of one of the other selectable controls, the computing device responds to the incoming message based on the other gesture selection. Thus, for the message "Will you be late?" a user may select, with aid from haptic guides, between two controls, one for "respond" and another for "ignore". After selecting the "respond" control, haptic controller 218 presents four options with an altered or new user interface to that having the "respond" and "ignore", each with a control in a region differentiated by haptic guides, that of "yes," "no", "I will be there soon," or "I can't make it." Assume that the user selects the control for "I will be there soon". Communication device 102 then sends a text responding "I will be there soon" to the sender of the original text message asking "Will you be late?".

Note that visual information can be presented on the visual display, as the haptic guides can be configured not to obscure the content in the visual display (or at least very little).

Note that haptic controller 218 may determine where and how to present haptic guides. Thus, haptic controller 218 may determine, based on a location of a selectable control in a user interface, a region of the visual display surface in which the selectable control resides. Haptic controller 218 may then simply surround the selectable control with a haptic guide. In some cases, haptic controller 218 determines the region to provide maximum region size for the region and other regions associated with other selectable controls in the user interface. Further still, haptic controller 218 may determine the region of the visual display surface based on an importance indicated for the selectable control relative to other selectable controls in the user interface and thus alter the region size based on the importance.

Method 1700 enables selection of haptic guides based on a user interface, and can be used alone or in combination, in whole or in part, with other methods described herein. At 1702, regions of a visual display surface in which selectable controls of a user interface reside are determined. Thus, haptic controller 218, alone in conjunction with one or more applications providing a user interface or mobile operating system 216, can determine locations on touch-sensitive display 116 having those selectable controls.

At 1704, haptic guides are raised above the visual display surface, the haptic guides separating the regions of the visual display effective to provide one of the selectable controls within each of the regions.

Figure 18:
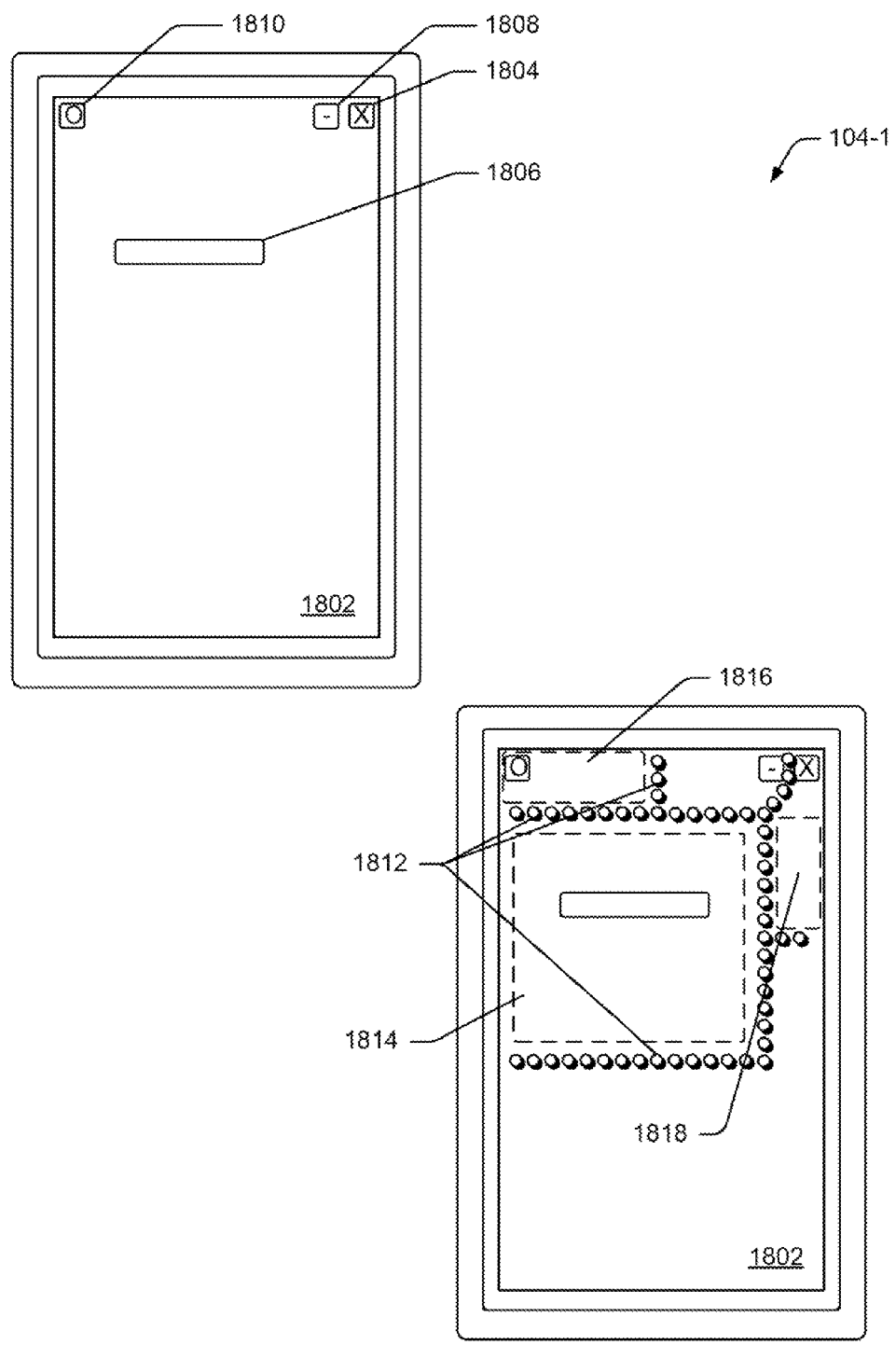
FIG. 18 illustrates selectable controls and regions provided by haptic guides for a smart phone.

Consider, for example, FIG. 18, which illustrates smartphone 104-1. Here a user interface 1802 for smartphone 104-1 includes four selectable controls, a close-application control 1804, a data-entry field 1806, a reduce-application size control 1808, and a re-load control 1810. Haptic controller 218 determines these locations and raises haptic guides 1812 to enable a user to more-easily select these four different controls. Note that haptic guides 1812 differentiate regions to enable easy selection, even for controls that are near to each other (close-application control 1804 and reduce-application size control 1808). Further, in cases where haptic controller 218 can communicate with the user interface's application and/or operating system, selection of the region can be considered to be selection of the control, even if that control, absent the haptic guides, would not be considered a selection. Thus, region 1814, on selection of any part of region 1814, is determined to select data-entry field control 1806 even though region 1814 is substantially larger than data-entry field control 1806. Further, region 1816, on selection of any part of region 1816, is determined to select re-load control 1810, even though region 1816 is larger than, and not centered around, re-load control 1810. Also, while these example regions encompass their respective selectable controls, haptic controller 218 may provide haptic guides to create regions that are disparate from, or do not fully contain, the selectable controls. This can be useful for users that are visually impaired or lack physical dexterity to select small or closely-spaced controls. Such a region is shown at dislocated region 1818. Selection within this region is determined to select close-application control 1804.

Note also that haptic guides for a smart phone or other device can be provided through a peripheral device, such as a display cover capable of providing tactile projections. This display cover can be at least partially transparent, thereby providing projections while also enabling viewing of the display.

Example Electronic Device

Figure 19:
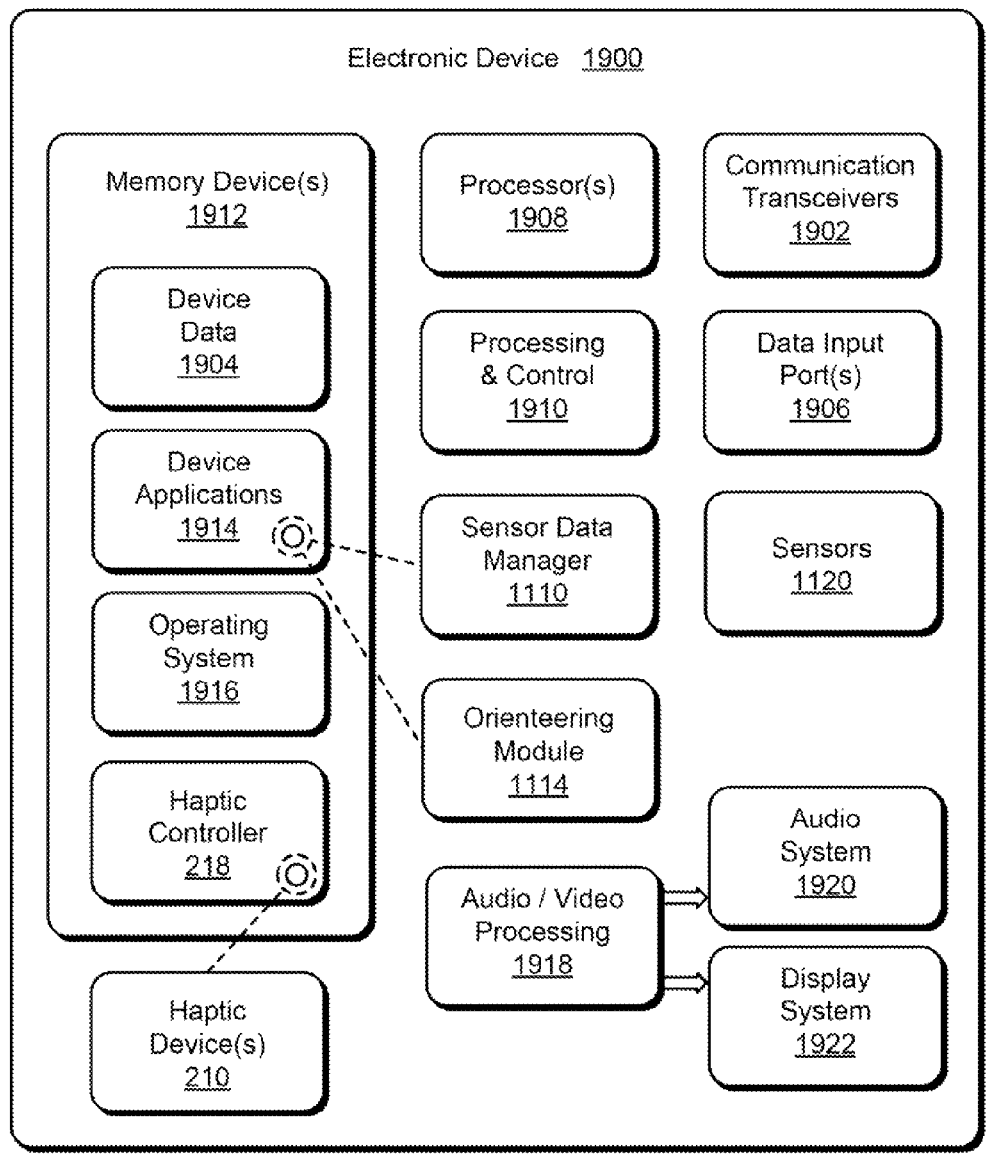
FIG. 19 illustrates an example electronic device that can be implemented as a wearable haptic and touch communication device, a wearable haptic device, a non-wearable computing device having a touch-sensitive display, and/or a remote computing device as described with reference to any of the previous FIGS. 1-18.

FIG. 19 illustrates various components of an example electronic device 1900 that can be implemented as a wearable haptic and touch communication device, a wearable haptic device, a non-wearable computing device having a touch-sensitive display, and/or a remote computing device as described with reference to any of the previous FIGS. 1-18. The device may be implemented as one or combination of a fixed or mobile device, in any form of a consumer, computer, portable, user, communication, phone, navigation, gaming, audio, messaging, Web browsing, paging, media playback, and/or other type of electronic device, such as the communication device 102 described with reference to FIG. 1.

Electronic device 1900 includes communication transceivers 1902 that enable wired and/or wireless communication of device data 1904, such as received data as described with reference to FIGS. 1 and 2. Example communication transceivers include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

Electronic device 1900 may also include one or more data input ports 1906 via which any type of data, media content, and/or inputs can be received, such as user-selectable inputs, messages, music, television content, recorded video content, and any other type of audio, video, and/or image data received from any content and/or data source. Data input ports 1906 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

Electronic device 1900 of this example includes processor system 1908 (e.g., any of application processors, microprocessors, digital-signal-processors, controllers, and the like), or a processor and memory system (e.g., implemented in a SoC), which process (i.e., execute) computer-executable instructions to control operation of the device. Processor system 1908 (processor(s) 1908) may be implemented as an application processor, embedded controller, microcontroller, and the like. A processing system may be implemented at least partially in hardware, which can include components of an integrated circuit or on-chip system, digital-signal processor (DSP), application-specific integrated circuit (ASIC), field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1910 (processing and control 1910). Although not shown, electronic device 1900 can include a system bus, crossbar, or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 1900 also includes one or more memory devices 1912 that enable data storage, examples of which include random access memory (RAM), non-volatile memory (e.g., read-only memory (ROM), flash memory, EPROM, EEPROM, etc.), and a disk storage device. Memory device(s) 1912 provide data storage mechanisms to store the device data 1904, other types of information and/or data, and various device applications 1914 (e.g., software applications). For example, operating system 1916 can be maintained as software instructions within memory device 1912 and executed by processors 1908. In some aspects, haptic controller 218 and/or orienteering module 1114 is embodied in memory devices 1912 of electronic device 1900 as executable instructions or code. Although represented as a software implementation, haptic controller 218 may be implemented as any form of a control application, software application, signal processing and control module, firmware that is installed on the device, a hardware implementation of the controller, and so on.

In embodiments, the electronic device 1900 includes haptic devices 210 as described with reference to FIGS. 1-18. Alternately or additionally, the electronic device 1900 may also include sensors 1120, orienteering module 1114, and sensor-data manager 1110 as described with reference to FIG. 11.

Electronic device 1900 also includes audio and/or video processing system 1918 that processes audio data and/or passes through the audio and video data to audio system 1920 and/or to display system 1922 (e.g., spectacles, displays on computing bracelet 102-1). Audio system 1920 and/or display system 1922 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In some implementations, audio system 1920 and/or display system 1922 are external components to electronic device 1900. Alternatively or additionally, display system 1922 can be an integrated component of the example electronic device, such as part of an integrated touch interface.

Although embodiments of haptic guides for a touch-sensitive display have been described in language specific to features and/or methods, the subject of the appended claims is not necessarily limited to the specific features or methods described. Rather, the specific features and methods are disclosed as example implementations haptic guides for a touch-sensitive display.

What is claimed is:

1. A method comprising:
   receiving an indication of a message;
   outputting information associated with a content of the message;
   causing a plurality of haptic guides to raise from and above a surface of a touch-sensitive display of a computing device, the plurality of haptic guides being integrated with the touch-sensitive display and comprising physical structures that separate a plurality of selectable regions of the touch-sensitive display, wherein one or more of the plurality of haptic guides at least partially surround each of the plurality of selectable regions;
   receiving an indication of a gesture selection at a first region of the plurality of selectable regions of the touch-sensitive display, wherein the first region is associated with a first selectable control that is output for display at the touch-sensitive display; and
   responsive to receiving the indication of the gesture selection at the first region, outputting, based on the gesture selection at the first region that is associated with the first selectable control, a response to the message.

2. The method of claim 1, further comprising:
   outputting, based on the content of the message, and for display in the plurality of selectable regions of the touch-sensitive display, a plurality of selectable controls that are associated with potential responses to the message, wherein the plurality of selectable controls includes the first selectable control that is included in the first region.

3. The method of claim 1, wherein the message is an incoming message received through an email service, a social media service, or a message-service communication.

4. The method of claim 1, wherein outputting the information associated with the content of the message comprises outputting, for display at the touch-sensitive display, visual information associated with the content of the message.

5. The method of claim 1, wherein outputting the information associated with the content of the message comprises outputting, at a surface of the computing device, haptic output associated with the content of the message.

6. The method of claim 1, wherein receiving the indication of the gesture selection at the first region of the plurality of selectable regions comprises receiving an indication of a first gesture selection at the first region, and wherein the method further comprises:

altering, based on the first gesture selection at the first region, the plurality of haptic guides; and after altering the plurality of haptic guides, receiving a second gesture selection at a second region of the plurality of selectable regions, wherein outputting the response to the message comprises outputting, based on the first gesture selection and the second gesture selection, the response to the message.

7. The method of claim 6, wherein altering the plurality of haptic guides comprises causing one or more of the plurality of haptic guides to be lowered.

8. The method of claim 1, wherein causing the plurality of haptic guides to raise above the surface of the touch-sensitive display comprises actuating areas of an electropolymer element, the areas corresponding to structures of the plurality of haptic guides.

9. The method of claim 1, further comprising:

determining, based on locations of a plurality of selectable controls that are output for display at the touch-sensitive display, the plurality of selectable regions of the touch-sensitive display in which the plurality of selectable controls reside, wherein one of the plurality of selectable controls is included in each of the plurality of selectable regions, and wherein the plurality of selectable controls includes the first selectable control.

10. The method of claim 1, wherein a size of the first region is larger than a size of the first selectable control.

11. The method of claim 1, wherein the first region at least partially includes the selectable control.

12. A mobile computing device, comprising:

a touch-sensitive display, the touch-sensitive display comprising:
 a visual display surface;
 a touch element configured to receive gesture input; and
 a haptic element configured to provide a plurality of haptic guides that project above the visual display surface;

one or more computer processors; and one or more computer-readable storage media having instructions stored thereon that, upon execution, cause the one or more computer processors to:
 determine, based on a location of a selectable control in a user interface that is output for display at the visual display surface, a region of the visual display surface in which the selectable control resides; and
 cause the haptic element to raise the plurality of haptic guides from and above the visual display surface to assist with gesture selection of the selectable control through the touch element, wherein the plurality of haptic guides are integrated with the touch-sensitive display and comprise physical structures that separate a plurality of regions of the visual display surface that includes the region in which the selectable control resides, and wherein one or more of the plurality of haptic guides at least partially surround each of the plurality of regions;
 receive an indication of the gesture selection at the region that is associated with the selectable control; and
 perform, based on the gesture selection at the region that is associated with the selectable control, one or more operations.

13. The mobile computing device of claim 12, wherein the plurality of haptic guides includes multiple tactile points projecting through voids in the visual display surface.

14. The mobile computing device of claim 12, wherein the instructions that cause the one or more computer processors to determine the region of the visual display surface cause the one or more computer processors to determine a size of the region that is larger than a size of the selectable control included in the region.

15. The mobile computing device of claim 12, wherein the instructions that cause the one or more computer processors to determine the region of the visual display surface cause the one or more computer processors to determine the region of the visual display surface further based on an importance indicated for the selectable control relative to other selectable controls in the user interface, the importance affecting a size of the region.

16. The mobile computing device of claim 12, wherein the touch element is a capacitive sensor configured to receive the gesture selection at the region through a human touch on, at, or over the visual display surface.

17. The mobile computing device of claim 12, wherein the touch element is a haptic projection raised above the visual display surface, within the region, and configured to provide an electric signal responsive to deformation.

18. The mobile computing device of claim 17, wherein the haptic projection is provided through a void of the visual display surface and displaced from the plurality of haptic guides.

19. The mobile computing device of claim 17, wherein the haptic projection is a separate haptic projection from the plurality of haptic guides, the separate haptic projection residing within the region and configured, on deformation, to provide an electric response to an electroactive polymer actuator array.

20. The mobile computing device of claim 12, wherein the haptic element is a transparent or partially transparent layer residing over the visual display surface.

21. The mobile computing device of claim 12, wherein the instructions further cause the one or more computer processors to, responsive to reception of the indication of the gesture selection at the region and an indication of an altered user interface or a new user interface:

determine a second location of a second selectable control of the altered user interface or the new user interface; and cause the haptic element to raise a second plurality of haptic guides above the visual display surface to assist with selection of the second selectable control.

22. The mobile computing device of claim 12, wherein the instructions further cause the one or more computer processors to:

determine, based on other locations of other selectable controls in the user interface, other regions of the visual display surface in which the other selectable controls reside; and cause the haptic element to raise other haptic guides above the visual display surface to assist further gesture selection of the other selectable controls.

23. The mobile computing device of claim 12, wherein the region at least partially includes the selectable control.

* * * * *